US010890459B2

(12) United States Patent
Matsumura et al.

(10) Patent No.: US 10,890,459 B2
(45) Date of Patent: Jan. 12, 2021

(54) SYSTEMS AND METHODS FOR VARIABLE ENERGY ROUTING AND TRACKING

(71) Applicants: John Matsumura, Pittsburgh, PA (US); Kyle Siler-Evans, Pittsburgh, PA (US)

(72) Inventors: John Matsumura, Pittsburgh, PA (US); Kyle Siler-Evans, Pittsburgh, PA (US)

(73) Assignees: John Matsumura, Pittsburgh, PA (US); Kyle Siler-Evans, Pittsburgh, PA (US)

( * ) Notice: Subject to any disclaimer, the term of this patent is extended or adjusted under 35 U.S.C. 154(b) by 39 days.

(21) Appl. No.: 16/155,791

(22) Filed: Oct. 9, 2018

(65) Prior Publication Data
US 2019/0113354 A1  Apr. 18, 2019

Related U.S. Application Data

(60) Provisional application No. 62/572,280, filed on Oct. 13, 2017.

(51) Int. Cl.
*G01C 21/34* (2006.01)
*G06F 7/00* (2006.01)
(Continued)

(52) U.S. Cl.
CPC ......... *G01C 21/3484* (2013.01); *G01C 21/20* (2013.01); *G01C 21/3453* (2013.01);
(Continued)

(58) Field of Classification Search
CPC ............ G01C 21/34; G06F 7/00; G06N 99/00
See application file for complete search history.

(56) References Cited

U.S. PATENT DOCUMENTS

| 5,742,922 A | 4/1998 | Kim |
| 6,587,780 B2 | 7/2003 | Trovato |

(Continued)

FOREIGN PATENT DOCUMENTS

| CN | 101294817 A | 10/2008 |
| CN | 102944887 B | 4/2015 |

(Continued)

OTHER PUBLICATIONS

Abstract of CN 102944887 A, Feb. 27, 2013, Corresponding to CN 102944887 B, Apr. 15, 2015, 1 Page.
(Continued)

*Primary Examiner* — Yuri Kan
(74) *Attorney, Agent, or Firm* — Lewis Roca Rothgerber Christie LLP

(57) ABSTRACT

A method for generating navigation routes for a vehicle includes: receiving an origin position, in a road network, of the vehicle; receiving a destination position, in the road network; receiving a user preference from a user interface device, the user preference indicating a tradeoff value having one of a plurality of values between travel time and energy efficiency; computing a time value for each of a plurality of road segments of the road network using a time consumption model; computing an energy consumption for each of the plurality of road segments of the road network using an energy consumption model; identifying a weighted route from the origin position to the destination position based on the time value and the energy consumption for the road segments and based on the user preference; and supplying the identified weighted route to a navigation system of the vehicle.

33 Claims, 11 Drawing Sheets

(51) Int. Cl.
*G06N 99/00* (2019.01)
*G01C 21/20* (2006.01)
*G05D 1/02* (2020.01)

(52) U.S. Cl.
CPC ....... *G01C 21/3469* (2013.01); *G05D 1/0217* (2013.01); *G05D 2201/0213* (2013.01)

(56) References Cited

U.S. PATENT DOCUMENTS

| | | | |
|---|---|---|---|
| 7,369,938 | B2 | 5/2008 | Scholl |
| 7,483,786 | B1 | 1/2009 | Sidoti et al. |
| 7,671,764 | B2 | 3/2010 | Uyeki et al. |
| 7,865,298 | B2 | 1/2011 | Macneille et al. |
| 8,255,152 | B2 | 8/2012 | Barth et al. |
| 8,712,676 | B2 | 4/2014 | Hiestermann et al. |
| 9,043,141 | B2 | 5/2015 | Kono et al. |
| 9,074,905 | B2 | 7/2015 | Nishiuma et al. |
| 2005/0159889 | A1* | 7/2005 | Isaac ................. G01C 21/3484 701/414 |
| 2008/0133120 | A1 | 6/2008 | Romanick |
| 2008/0270016 | A1 | 10/2008 | Proietty et al. |
| 2008/0275644 | A1 | 11/2008 | Macneille et al. |
| 2010/0049397 | A1 | 2/2010 | Liu et al. |
| 2010/0286909 | A1 | 11/2010 | Tate, Jr. et al. |
| 2011/0040438 | A1* | 2/2011 | Kluge ................. G01C 21/3469 701/31.4 |
| 2011/0166774 | A1 | 7/2011 | Schunder |
| 2011/0184642 | A1 | 7/2011 | Rotz et al. |
| 2011/0238457 | A1 | 9/2011 | Mason et al. |
| 2012/0109512 | A1 | 5/2012 | Calkins |
| 2013/0060469 | A1* | 3/2013 | Chen ................. G01C 21/3469 701/527 |
| 2013/0151046 | A1 | 6/2013 | Choi et al. |
| 2014/0229101 | A1* | 8/2014 | Glaser ................. G01C 21/3614 701/487 |
| 2015/0046076 | A1 | 2/2015 | Costello |
| 2016/0033293 | A1* | 2/2016 | Nobrega ............ G01C 21/3415 701/423 |
| 2017/0192437 | A1 | 7/2017 | Bier et al. |
| 2017/0262790 | A1 | 9/2017 | Khasis |
| 2017/0307391 | A1 | 10/2017 | Mason et al. |
| 2018/0017398 | A1* | 1/2018 | McNew ............. G01C 21/3492 |
| 2018/0240041 | A1* | 8/2018 | Koch ........................ G06N 3/08 |

FOREIGN PATENT DOCUMENTS

| | | |
|---|---|---|
| CN | 106225800 A | 12/2016 |
| JP | 4997011 B2 | 8/2012 |
| KR | 10-0979745 B1 | 9/2010 |
| KR | 10-1308264 B1 | 9/2013 |

OTHER PUBLICATIONS

Abstract of JP 2009031046 A, Feb. 12, 2009, Corresponding to JP 4997011 B2, Aug. 8, 2012, 1 Page.
Abstract of KR 20090037196 A, Apr. 15, 2009, Corresponding to KR 10-0979745 B1, Sep. 2, 2010, 1 Page.
Abstract of KR 20130090977 A, Aug. 16, 2013, Corresponding to KR 10-1308264 B1, Sep. 13, 2013, 1 Page.
Google.com, play.google.com/store/apps/details, EcoDrive Free Speedometer—Apps on Google Play, Website: https://play.google.com/store/apps/details?id=com.joynow.ecodrivefree&hl=en_US, Downloaded: Feb. 6, 2019, 5 Pages, Google.com, U.S.A.
Sorrel, Charlie, EcoSpeed App Saves 30% on Gas With Clever Routing, Charlie Sorrel Gear, Website: https://www.wired.com/2012/01/ecospeed-app-saves-30-on-gas-with-clever-routing/, Jan. 30, 2012, 3 Pages, Wired.com, U.S.A.
Mygreencar.com, Car Shopping? Or Just Curious? Take a Virtual Test Drive, Welcome to MyGreenCar, Website: https://mygreencar.com/, 2018, 12 Pages, Mygreencar.com, U.S.A.
Macdougall, Pamela, Want a Greener Car? Let the Data Drive You, Website: https://www.nrdc.org/experts/pamela-macdougall/want-greener-car-let-data-drive-you, Jul. 31, 2018, 3 Pages, NRDC.org, U.S.A.
Google.com, About-Google Maps, Website: https://www.google.com/maps/about/, Downloaded: Feb. 7, 2019, 9 Pages, Google.com, U.S.A.
Nagarajan, Ramesh, Take control of your commute with Google Maps, Blog.Google, Website: https://blog.google/products/maps/take-control-your-commute-google-maps/, Oct. 1, 2018, 4 Pages, Google.com, U.S.A.
Chang, Ing-Chau et al., Design and Implementation of the Travelling Time- and Energy-Efficient Android GPS Navigation App with the VANET-based A* Route Planning Algorithm, 2013 International Symposium on Biometrics and Security Technologies, Jul. 2, 2013, pp. 85-92, IEEE Computer Society, Taiwan.
Figueroa, Joseph N., Abstract: Air Friction Vehicle Minimizer for Weather-Service-Enabled Portable Navigation Device, Website: priorart.ip.com/IPCOM/000174423,IP.com Disclosure No. Ipcom000174423d, Sep. 8, 2008, 3 Pages.
IBM, Abstract: Real time route update in navigation systems using vehicle and driver data, Website: priorart.ip.com/IPCOM/000181701,IP.com Disclosure No. IPCOM000181701D, Apr. 9, 2009, 3 Pages.
Lin, Jie et al., A Real-Time En-Route Route Guidance Decision Scheme for Transportation-Based Cyberphysical Systems, IEEE Transactions on Vehicular Technology, Mar. 2017, pp. 2551-2566, vol. 66, No. 3, IEEE.
Nallur, Vivek et al., Smart Route Planning Using Open Data and Participatory Sensing, 11th International Conference on Open Source Systems (OSS), May 2015, 11 Pages, IFIP International Federation for Information Processing 2015, Florence, Italy.
Neaimeh, M. et al., Investigating the effects of topography and traffic conditions on the driving efficiency of Electric Vehicles to better inform smart navigation, School of Civil Engineering and Geosciences, Sep. 25, 2012, 6 Pages, Newcastle University, U.K.
Nielsen, Didrik, Tree Boosting With XGBoost—Why Does XGBoost Win "Every" Machine Learning Competition?, Master of Science in Physics and Mathematics, Dec. 2016, Norwegian University of Science and Technology Department of Mathematical Sciences, Norway.
Scora, George et al., Value of eco-friendly route choice for heavy-duty trucks, Research in Transportation Economics, 2015, pp. 3-14, vol. 52, Elsevier Ltd., U.S.A.

\* cited by examiner

FIG. 8

SYSTEMS AND METHODS FOR VARIABLE ENERGY ROUTING AND TRACKING

CROSS-REFERENCE TO RELATED APPLICATION(S)

This application claims the benefit of U.S. Provisional Patent Application No. 62/572,280 "SYSTEM AND METHOD FOR VARIABLE ENERGY ROUTING AND TRACKING," filed in the United States Patent and Trademark Office on Oct. 13, 2017, the entire disclosure of which is incorporated by reference herein.

FIELD

Aspects of embodiments of the present invention relate to the field of vehicle navigation, including computing routes for vehicles to navigate between locations by a path based on estimated minimized time, energy usage, or a weighted combination of the two as determined by user input, informed by real-time estimates of cost of time and energy.

BACKGROUND

Consumers and manufacturers of automotive vehicles, including conventional vehicles, hybrid electric vehicles (HEVs), and plug-in electric vehicles (PEVs), are generally not achieving maximum energy efficiency. Modern vehicles have shown great improvements in energy efficiency—measured in terms of miles-per-gallon in part driven by more stringent federal and state standards. Building on this improvement, manufacturers are increasingly incorporating selectable "eco" or "green" modes, which allow the driver to improve energy efficiency while reducing vehicle performance. However, while improvements to energy efficiency in the vehicles themselves are continuing, very little has been implemented towards improving energy efficiency in the routing options available to the drivers of the vehicles. Modern vehicles and navigation systems generally do not support increased energy efficiency through real-time or near real-time routing or re-routing.

SUMMARY

Aspects of embodiments of the present invention relate to systems and methods for routing vehicles through networks of roads with a variable selection mode of routing based on time, energy usage, or a weighted combination of the two. Some aspects of embodiments of the present invention relate to improving the energy efficiency of vehicles through routing.

According to one embodiment of the present invention, a system for generating navigation routes for a vehicle includes: a processor; a memory coupled to the processor, the memory storing instructions that, when executed by the processor, cause the processor to: receive an origin position, in a road network, of the vehicle; receive a destination position, in the road network; receive a user preference from a user interface device, the user preference indicating a tradeoff value between travel time and energy efficiency; compute a time value for each of a plurality of road segments of the road network using a time consumption model; compute an energy consumption for each of the plurality of road segments of the road network using an energy consumption model; identify a "weighted" route from the origin position to the destination position based on the time value and the energy consumption for the road segments and based on the user preference; and supply the identified weighted route to a navigation system of the vehicle.

The memory may further store instructions that, when executed by the processor, cause the processor to: compute a most time efficient route based on the time consumption model; compute a most energy efficient route based on the energy consumption model; and compute the identified weighted route based on a weighting of time value and energy consumption derived from real-time data from the vehicle and the user input tradeoff value resulting in a compromise between the most time efficient route and the most energy efficient route.

The system may further include a geographic positioning system onboard the vehicle, and the origin position may correspond to a current position of the vehicle, as provided by the geographic positioning system.

The navigation system of the vehicle may include a display device onboard the vehicle and configured to display the identified weighted route. The navigation system may provide the user with the relevant information about the time versus energy tradeoffs between different route options.

The navigation system of the vehicle may be controlled remotely, and the identified weighted route may be displayed on a computing device remote from the vehicle.

The navigation system of the vehicle may be configured to control an autonomous driving system of the vehicle to drive the vehicle along the identified weighted route.

The memory may further store instructions that, when executed by the processor, cause the processor to compute the time value for each of the road segments by supplying a plurality of parameters to a time consumption model, the plurality of parameters being based on at least one of: static information associated with each of the road segments; and dynamic information associated with each of the road segments.

The static information associated with each road segment of the road segments may include: a length of road segment; a speed limit along the road segment; a road class of the road segment; and a number of stops along the road segment, and the dynamic information associated with the road segment may include traffic data.

The memory may further store instructions that, when executed by the processor, cause the processor to compute the energy consumption for each road segment of the road segments by supplying a plurality of parameters to an energy consumption model, the plurality of parameters being based on at least one of: static information associated with the road segment; dynamic information associated with the road segment; static information associated with the vehicle; and dynamic information associated with the vehicle.

The static information associated with the road segment may include: a length of the road segment; a net elevation gain over the road segment; a net elevation loss over the road segment; and a number of stops along the road segment, and the dynamic information associated with the road segment may include an expected average speed of vehicle along the road segment, the static information associated with the vehicle may include a vehicle class; and the dynamic information associated with the vehicle may include a vehicle weight.

The net elevation gain over the route and the net elevation loss over the route may be computed from topographical data associated with segments of roads along the route.

The system may further include: an accelerometer onboard a data collection vehicle; and a collection device onboard the data collection vehicle and configured to collect a plurality of operating data from the data collection vehicle, the plurality of operating data may include: vehicle speed of the data collection vehicle; engine speed of the data collection vehicle; throttle position of the data collection vehicle; geographic positions from a geographic positioning system; energy (e.g., fuel and/or electricity) usage of the data collection vehicle; and accelerometer data from the accelerometer of the data collection vehicle.

The system may further include a server computer including a server processor and a server memory storing instructions that, when executed by the server processor, cause the server processor to: receive the plurality of operating data from the collection device of the data collection vehicle; aggregate the plurality of operating data with other vehicle operating data for each road segment of the road segments of the road network; compute the time consumption model from the aggregated operating data and static information associated with the road segments; and compute the energy consumption model from the aggregated operating data and the static information associated with the road segments.

The time consumption model may include a linear model. The linear model of the time consumption model may be configured by performing a linear regression to compute a plurality of coefficients of the linear model of the time consumption model based on the aggregated operating data and the static information associated with the road segments, wherein the energy consumption model may include a linear model, and wherein the linear model of the energy consumption model may be configured by performing linear regression to compute a plurality of coefficients of the linear model of the energy consumption model based on the aggregated operating data and the static information associated with the road segments.

The time consumption model may include a gradient boosting tree model including a plurality of functions, the gradient boosting tree model of the time consumption model may be configured by learning the functions and weights of the gradient boosting tree model based on the aggregated operating data and the static information associated with the road segments, the energy consumption model may include a gradient boosting tree model including a plurality of functions, and the gradient boosting tree model of the energy consumption model may be configured by learning the functions and weights of the gradient boosting tree model based on the aggregated operating data and the static information associated with the road segments.

The time consumption model may include a neural network, the neural network of the time consumption model may be configured by performing backpropagation to compute a plurality of weights of connections of the neural network based on the aggregated operating data, the energy consumption model may include a neural network, and the neural network of the energy consumption model may be configured by performing backpropagation to compute a plurality of weights of connections of the neural network based on the aggregated operating data.

According to one embodiment of the present invention, a method for generating navigation routes for a vehicle includes: receiving an origin position, in a road network, of the vehicle; receiving a destination position, in the road network; receiving a user preference from a user interface device, the user preference indicating a tradeoff value having one of a plurality of values between travel time and energy efficiency; computing a time value for each of a plurality of road segments of the road network using a time consumption model; computing an energy consumption for each of the plurality of road segments of the road network using an energy consumption model; identifying a weighted route from the origin position to the destination position based on the time value and the energy consumption for the road segments and based on the user preference; and supplying the identified weighted route to a navigation system of the vehicle.

The method may further include: computing a most time efficient route based on the time consumption model; computing a most energy efficient route based on the energy consumption model; and computing the identified weighted route based on a weighting of time value and energy consumption derived from real-time data from the vehicle and the user input tradeoff value resulting in a compromise between the most time efficient route and the most energy efficient route.

The vehicle may include a geographic positioning system onboard the vehicle, and the origin position may correspond to a current position of the vehicle, as provided by the geographic positioning system.

The navigation system of the vehicle may include a display device onboard the vehicle and configured to display the identified weighted route.

The navigation system of the vehicle may be controlled remotely, and the identified weighted route may be displayed on a computing device remote from the vehicle.

The navigation system of the vehicle may be configured to control an autonomous driving system of the vehicle to drive the vehicle along the identified weighted route.

The computing of the time consumption for each of the road segments may include supplying a plurality of parameters to a time consumption model, the plurality of parameters being based on at least one of: static information associated with each of the road segments; and dynamic information associated with each of the road segments.

The static information associated with each road segment of the road segments may include: a length of road segment; a speed limit along the road segment; a road class of the road segment; and a number of stops along the road segment, and the dynamic information associated with the road segment may include traffic data.

The computing of the energy consumption for each road segment of the road segments may include supplying a plurality of parameters to an energy consumption model, the plurality of parameters being based on at least one of: static information associated with the road segment; dynamic information associated with the road segment; static information associated with the vehicle; and dynamic information associated with the vehicle.

The static information associated with the road segment may include: a length of the road segment; a net elevation gain over the road segment; a net elevation loss over the road segment; and a number of stops along the road segment, and the dynamic information associated with the road segment may include an expected average speed of vehicle along the road segment, the static information associated with the vehicle may include a vehicle class, and the dynamic information associated with the vehicle may include a vehicle weight.

The net elevation gain over the route and the net elevation loss over the route may be computed from topographical data associated with segments of roads along the route.

In the method, a data collection vehicle may include: an accelerometer onboard the data collection vehicle; a collection device onboard the data collection vehicle and configured to collect a plurality of operating data from the data collection vehicle, the plurality of operating data may include: vehicle speed of the data collection vehicle; engine speed of the data collection vehicle; throttle position of the data collection vehicle; geographic positions from a geographic positioning system; energy (fuel and/or electricity) usage of the data collection vehicle; and accelerometer data from the accelerometer of the data collection vehicle.

The method may further include: receiving the plurality of operating data from the collection device of the data collection vehicle; aggregating the plurality of operating data with other vehicle operating data for each road segment of the road segments of the road network; computing the time consumption model from the aggregated operating data and static information associated with the road segments; and computing the energy consumption model from the aggregated operating data and the static information associated with the road segments.

The time consumption model may include a linear model, the linear model of the time consumption model may be configured by performing linear regression to compute a plurality of coefficients of the linear model of the time consumption model based on the aggregated operating data and the static information associated with the road segments, the energy consumption model may include a linear model, and the linear model of the energy consumption model may be configured by performing linear regression to compute a plurality of coefficients of the linear model of the energy consumption model based on the aggregated operating data and the static information associated with the road segments.

The time consumption model may include a gradient boosting tree model including a plurality of functions, the gradient boosting tree model of the time consumption model may be configured by learning the functions and weights of the gradient boosting tree model based on the aggregated operating data and the static information associated with the road segments, the energy consumption model may include a gradient boosting tree model including a plurality of functions, and the gradient boosting tree model of the energy consumption model may be configured by learning the functions and weights of the gradient boosting tree model based on the aggregated operating data and the static information associated with the road segments.

The time consumption model may include a neural network, the neural network of the time consumption model may be configured by performing backpropagation to compute a plurality of weights of connections of the neural network based on the aggregated operating data, the energy consumption model may include a neural network, and the neural network of the energy consumption model may be configured by performing backpropagation to compute a plurality of weights of connections of the neural network based on the aggregated operating data.

According to one embodiment of the present invention, a system for generating navigation routes for a vehicle includes: a processor; a memory coupled to the processor, the memory storing instructions that, when executed by the processor, cause the processor to: receive an origin position, in a road network, of the vehicle; receive a destination position, in the road network; receive a user preference from a user interface device, the user preference indicating a tradeoff value having one of a plurality of values between travel time and energy efficiency; compute a time value for each of a plurality of road segments of the road network using a time consumption model; compute an energy consumption for each of the plurality of road segments of the road network using an energy consumption model; identify a weighted route from the origin position to the destination position based on the time consumption and the energy consumption for the road segments and based on the user preference; and supply the identified weighted route to a navigation system of the vehicle, wherein aggregated operating data is collected from a plurality of data collection vehicles, each data collection vehicle of the data collection vehicles including: an accelerometer onboard a data collection vehicle; and a collection device onboard the data collection vehicle and configured to collect a plurality of operating data from the data collection vehicle, the plurality of operating data including: vehicle speed of the data collection vehicle; engine speed of the data collection vehicle; throttle position of the data collection vehicle; geographic positions from a geographic positioning system; energy (fuel and/or electricity) usage of the data collection vehicle; and accelerometer data from the accelerometer of the data collection vehicle, wherein the time consumption model is computed from the aggregated operating data and static information associated with the road segments, and wherein the energy consumption model is computed from the aggregated operating data and the static information associated with the road segments.

BRIEF DESCRIPTION OF THE DRAWINGS

The accompanying drawings, together with the specification, illustrate exemplary embodiments of the present invention, and, together with the description, serve to explain the principles of the present invention.

FIG. 8 depicts tradeoffs between time and energy usage based on user input under an example set of conditions according to one embodiment of the present invention.

DETAILED DESCRIPTION

Figure 1:
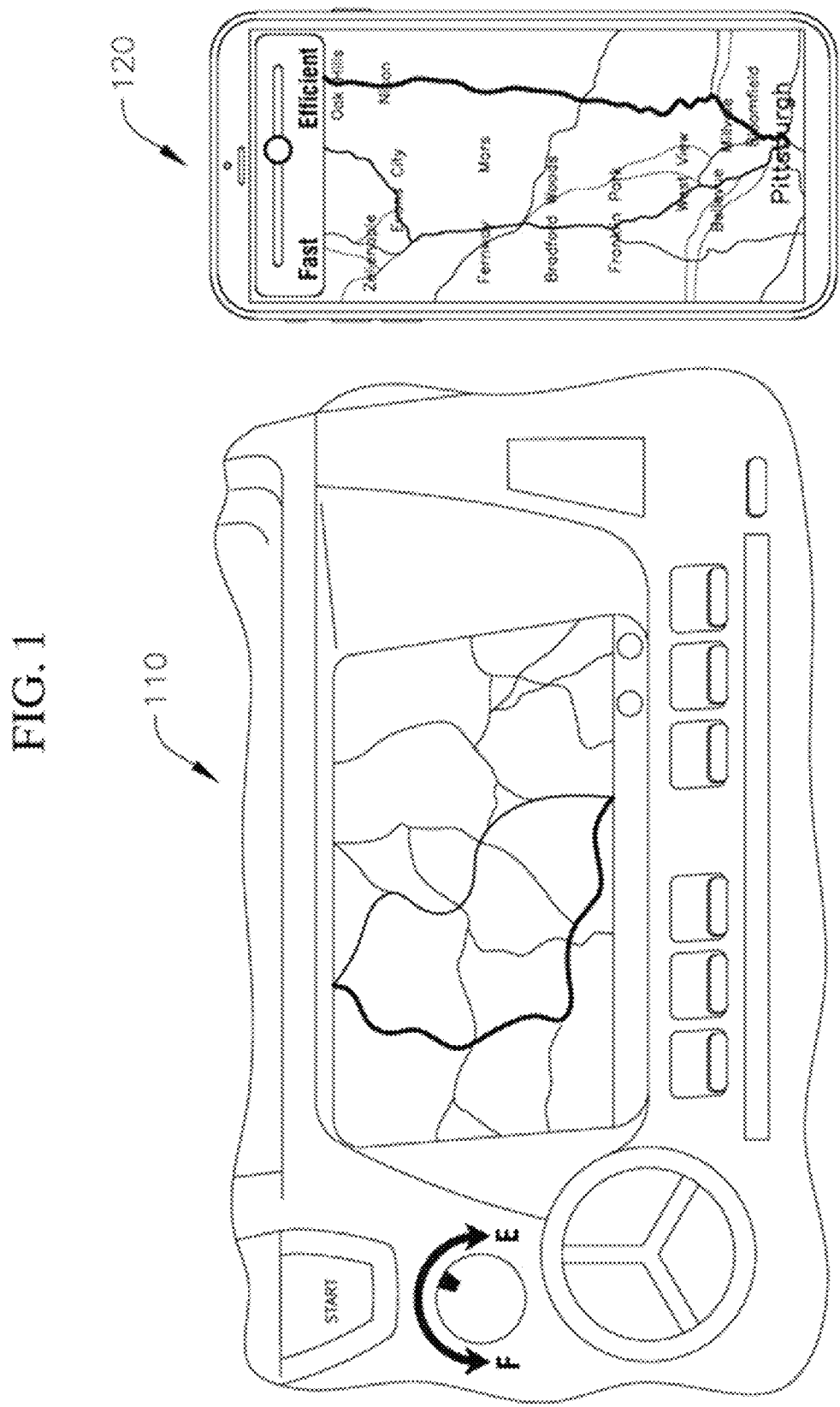
FIG. 1 depicts examples of user interfaces for controlling user route planning preferences according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

Modern vehicles and navigation systems generally do not support increased energy efficiency through real-time or near real-time routing. Accordingly, aspects of embodiments of the present invention are directed to systems and methods that provide near real-time routing to increase the overall energy efficiency of vehicles by accounting for elements of the environment including: the road network; terrain elevation (e.g., topography); type of terrain; traffic; driving style; and the specific characteristics of the vehicle including the vehicle mass, efficiency characteristics, engine/powertrain (such as the normally-aspirated Otto cycle based engines, hybrid electric, and electric drive and plug-in electric vehicles), and emissions. Including these multiple factors often reveals routes that are more efficient than the routes intuitively chosen by human planners or existing route planning tools.

For example, often the shortest route or the perceived fastest route is the assumed route; however, analysis of representative commuter traffic in a major city shows that such selected routes are often not the most energy efficient routes. (Analysis of commuter data from U.S. census data in the Pittsburgh region shows over half the routes can be improved significantly from a fuel efficiency standpoint, along with a similar reduction in corresponding emissions/pollutants.) Energy efficiency combines physical and non-physical attributes, the type of automobile, the route traffic, route topography, speed on the road, and driving style. The particular combination of these variables often leads to unintuitive route choices that result in minimal energy usage.

Aspects of embodiments of the present invention relate to systems and methods for navigation routing based on real-time preferences of energy efficiency versus time. In some embodiments of the present invention, the systems and methods are implemented as a vehicle mobile platform and application. Some aspects of embodiments of the present invention relate to methods based on statistical techniques for predicting the Time and Energy Use (as used herein, the term "energy" includes fuel and electricity, which can be expressed through fuel equivalency) required to travel all road segments within a network of roads. In some such embodiments, a utility function combines the Time and Energy values for each road segment in the network based on existing conditions (e.g., static conditions such as topography and dynamic conditions such as traffic and temporary closures), where the relative weighting between Time and Energy Efficiency reflects a current preference setting (e.g., the driver's real-time preference or a preference set externally, such as by a fleet management system). An example embodiment of this device is described in more detail below in which the driver (or other user) uses a knob, dial, or digital slider bar to indicate their preferences for routes that optimize for time, energy efficiency, or a balance or combination of the two. In some embodiments of the present invention, an optimization algorithm minimizes the relevant road-network attributes (time, energy, or the weighted combination of the two) in order to provide a route that is consistent with the driver's preferences at that time.

In addition, the routes may be planned in embodiments of the present invention based on near real-time driver or user preferences regarding the balancing of the various factors, thereby allowing further customization based on current driver or user goals. The term "user," as used herein includes anyone who is able to modify the routing of a vehicle, including drivers of vehicles, passengers of autonomous vehicles (AVs) who can control the route planning systems of the AVs, and remote users such as individual users controlling single autonomous private vehicles and fleet managers controlling the routing of autonomous cargo trucks (e.g., cargo trucks, package delivery vehicles, concrete mixing transport trucks, and the like), passenger transport vehicles (e.g., buses and shuttles), and the like.

Some embodiments may be implemented in vehicle navigation systems, such as navigation systems for guiding human drivers or such as navigation systems planning overall routes for an autonomous vehicle. In some embodiments, this relates to a device that applies statistical techniques for predicting the time and energy use along with vehicle emissions required to travel various road segments within a road network. The use of the term energy here can refer to fuel or electricity, which can be expressed through fuel equivalency.

Systems according to some embodiments are implemented within a vehicle. Systems according to some embodiments are implemented in a server based computing device (e.g., in data center of a cloud computing system). Systems according to some embodiments are implemented in combinations of in-vehicle devices and server computing systems.

Aspects of embodiments of the present invention relate to considering the time and energy values for each road segment based on existing conditions, where the relative weighting between time and energy efficiency reflects the driver's real-time preference. For example, in some embodiments, a user interface control such as a knob, dial, or digital slider bar may be used to indicate preferences of routes that optimize time, energy efficiency, or a combination of the two. In some embodiments of the present invention, the user interface control is implemented in a device in the vehicle. In some embodiments of the present invention, the user interface control is remote to the vehicle (e.g., implemented by an end user computing device such as a web browser or application running on a tablet computer, smartphone, laptop computer, or desktop computer in communication, where the vehicle may receive input over a wireless communications channel such as a cellular data connection). Aspects of embodiments of the present invention are directed to providing a route that best meets the time and energy efficiency preferences in accordance with the relevant attributes, e.g., time, energy (and emissions), or the weighted combination of the two of the road segments in the road-network at the time that the route in undertaken, e.g., in real-time or substantially real-time.

Generally, in the commercial and consumer sectors, route planning applications assume that either the shortest or the fastest route would be the preferred route. In contrast, embodiments of the present invention broaden the portfolio of choices that are available to drivers and users seeking greater discretion in their routes and the impact on energy consumption as well as level of pollution emitted into the atmosphere.

For the sake of convenience, aspects of embodiments of the present invention will be discussed in the context of a mobile platform and application for variable energy routing. However, embodiments of the present invention are not limited thereto and may be implemented in other ways without departing from the spirit and scope of the invention. For example, as noted above, in some embodiments of the present invention, some aspects of the method may be implemented in a remote computing system (e.g., a server or a cloud based computing system), where, for example, a route is planned by the remote computing system and the planned route is transmitted to the vehicle for use in navigation. As another example, in some embodiments of the present invention, one or more routes are computed by the remote computing system and the one or more routes are transmitted to the vehicle for a local (e.g., on-board) selection of one of the routes.

In more detail, aspects of embodiments of the present invention are directed to a near real-time route planning device that provides drivers or users a choice between the estimated fastest route, the most energy efficient route, and options in between these two extremes, depending on the user's real-time preference. In some embodiments, the routes are determined by the device to reflect the driver/user input either before traveling or en route, where the device will adjust the routing based on the input in near real-time. In some embodiments, user preferences between the fastest route, the most energy efficient route, or something in between is expressed through the turn of knob or dial or slide of a bar (mechanical or electronic). See, for example, the user interfaces depicted in FIG. 1.

Figure 8:
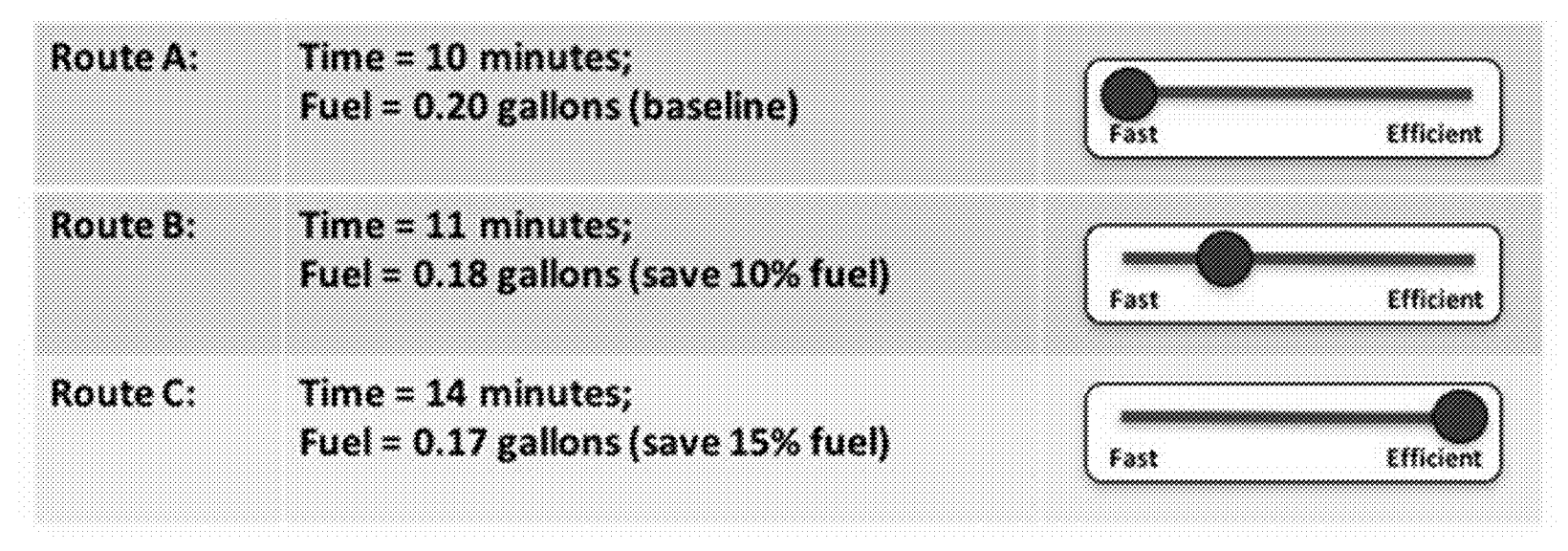

Some aspects of the invention are directed to providing detailed feedback that informs the driver and/or user of the characteristics of the routes spanning time and energy (fuel and/or electricity) efficiency by showing the tradeoff of time versus energy within the various available routes based directly on driver/user input (see, for example, FIG. 8). In some aspects of embodiments of the present invention, a routing algorithm uses data generated on the specific automobile being driven (e.g., physical characteristics of the vehicle, such as curb weight, energy efficiency at various speeds, and the like, as identified based on make, model, and year), the type and topography of the road network options available, and the current road traffic. In some embodiments, real-time traffic information may be retrieved from publicly accessible data sources through application program interfaces (API), and in other embodiments may be sourced directly from other drivers or user populations (e.g., crowd-sourced from other vehicles).

Aspects of embodiments of the present invention relate to a road navigation system that computes a route in accordance with a driver or user's choice between, for example, (1) the route that reaches a destination most quickly, (2) the route that reaches a destination with the least amount of energy consumed and pollution emitted, and (3) a route that weights the priorities of time and energy efficiency/pollution, where the relative weighting between the two priorities is provided by user input through the position of a knob, dial, or slider bar. FIG. 1 depicts examples of user interfaces for controlling user route planning preferences according to one embodiment of the present invention. As seen in FIG. 1, a route planning navigation system is implemented, in some embodiments, as an integrated component 110 of a vehicle (e.g., an in-car navigation system) and, in other embodiments, as an application running on a computing device 120 (e.g., a smartphone).

Figure 2:
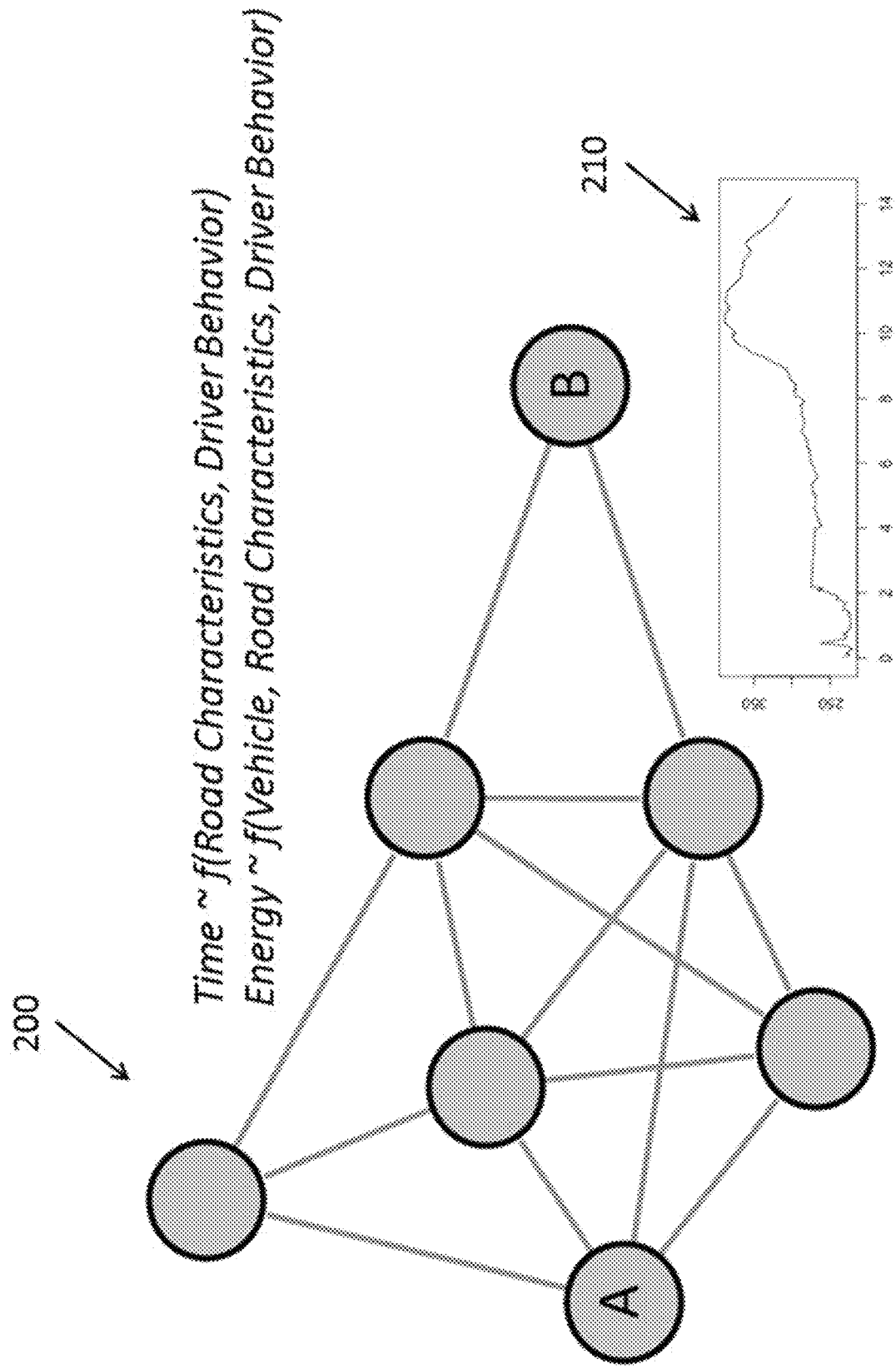
FIG. 2 depicts various attributes of a road network modeled according to one embodiment of the present invention.

Some embodiments of the present invention, as described in more detail below, involve using statistical techniques with high-resolution data to predict the time and energy use required to travel each road segment within a road network. In some embodiments of the present invention, portions of the computation that are fixed or substantially constant over time (e.g., "static") can be pre-processed in advance and are stored in a road-network database. FIG. 2 depicts various attributes of a road network 200 modeled according to one embodiment of the present invention. The road network 200 may include models of Time and Energy Usage as functions of parameters. For example, the time expected to traverse a particular segment of the road network may be a function of road characteristics (e.g., road class, locations of stoplights and stop signs, locations of crosswalks, speed limit, number of lanes, typical traffic load, elevation change, and the like) and driver behavior (e.g., more aggressive or less aggressive). The energy expected to be used to traverse a particular segment of the road network 200 may be a function of the particular vehicle (e.g., weight, energy efficiency at various speeds, and the like), road characteristics (similar road characteristics as above, in addition to elevation 210), and driver behavior.

The constant or static attributes are used in conjunction with an optimization algorithm to find a route through a road network between an origin position and a destination position (both of which are in the road network), where the route may be the most expedient route, the most energy-efficient route, or a combination of both (a balance between expedience and energy efficiency), as specified by the user. In some embodiments of the present invention, the calculation includes incorporating near real-time data such as traffic and variable speed on the road network and driver behavior (e.g. more or less aggressive driving style) and this "dynamic" component is combined with the pre-processed data (the "static" component) to compute more accurate estimates on time and energy use. Further, aspects of embodiments of the present invention are directed to combining and weighting the time and energy use attributes, where the weighting between the two priorities reflects the driver's or user's real-time preferences, in order to find a route that matches the current priorities of time and energy efficiency among available routes.

Some aspects of embodiments of the present invention relate to an onboard data logger or equivalent device is used to collect high-temporal resolution data, which may include, but is not limited to, vehicle speed, vehicle acceleration, throttle position, GPS location, elevation, and engine fuel or electricity consumption. In order to accurately reflect driver behavior, in some embodiments, these data are collected under normal driving conditions, rather than in a laboratory or other controlled environment.

Figure 3:
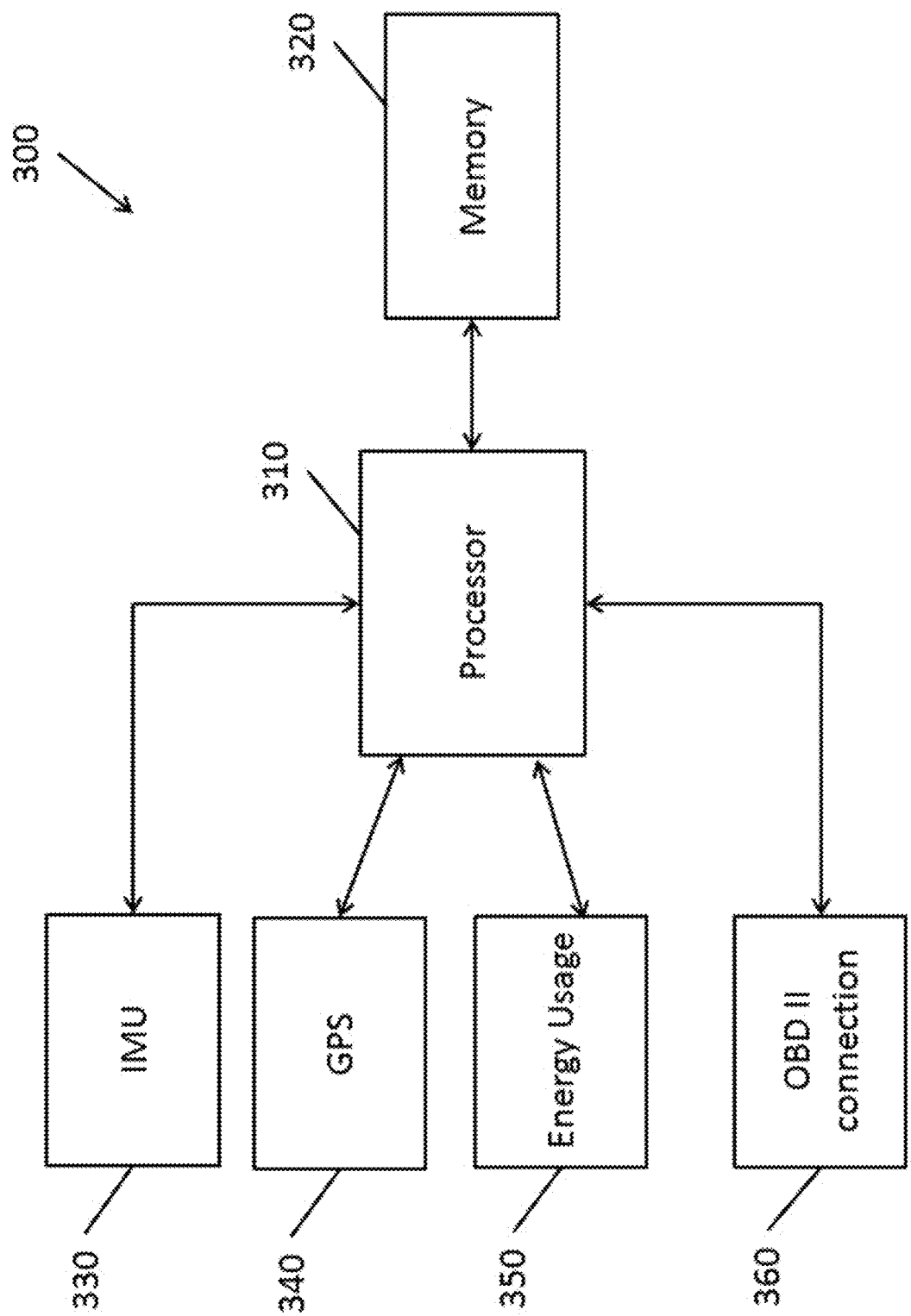
FIG. 3 is a block diagram of an onboard data logger according to one embodiment of the present invention.

FIG. 3 is a block diagram of an onboard data logger according to one embodiment of the present invention. In the embodiment shown in FIG. 3, the onboard data logger 300 includes a processor 310 coupled to memory 320 and data sources, where the data sources may include an inertial measurement unit (IMU) 330 for tracking acceleration, a global positioning system (GPS) receiver 340, sensors 350 to collect real-time energy use, and an on-board diagnostics (OBD II) connection 360 to allow the onboard data logger 300 to connect to various subsystems of the vehicle, including collecting information on vehicle speed, engine speed (e.g., in revolutions per minute), throttle position, and the like. These could directly interface with the on-board diagnostics or be directly integrated into the vehicles' onboard data system.

Model Training

Figure 4:
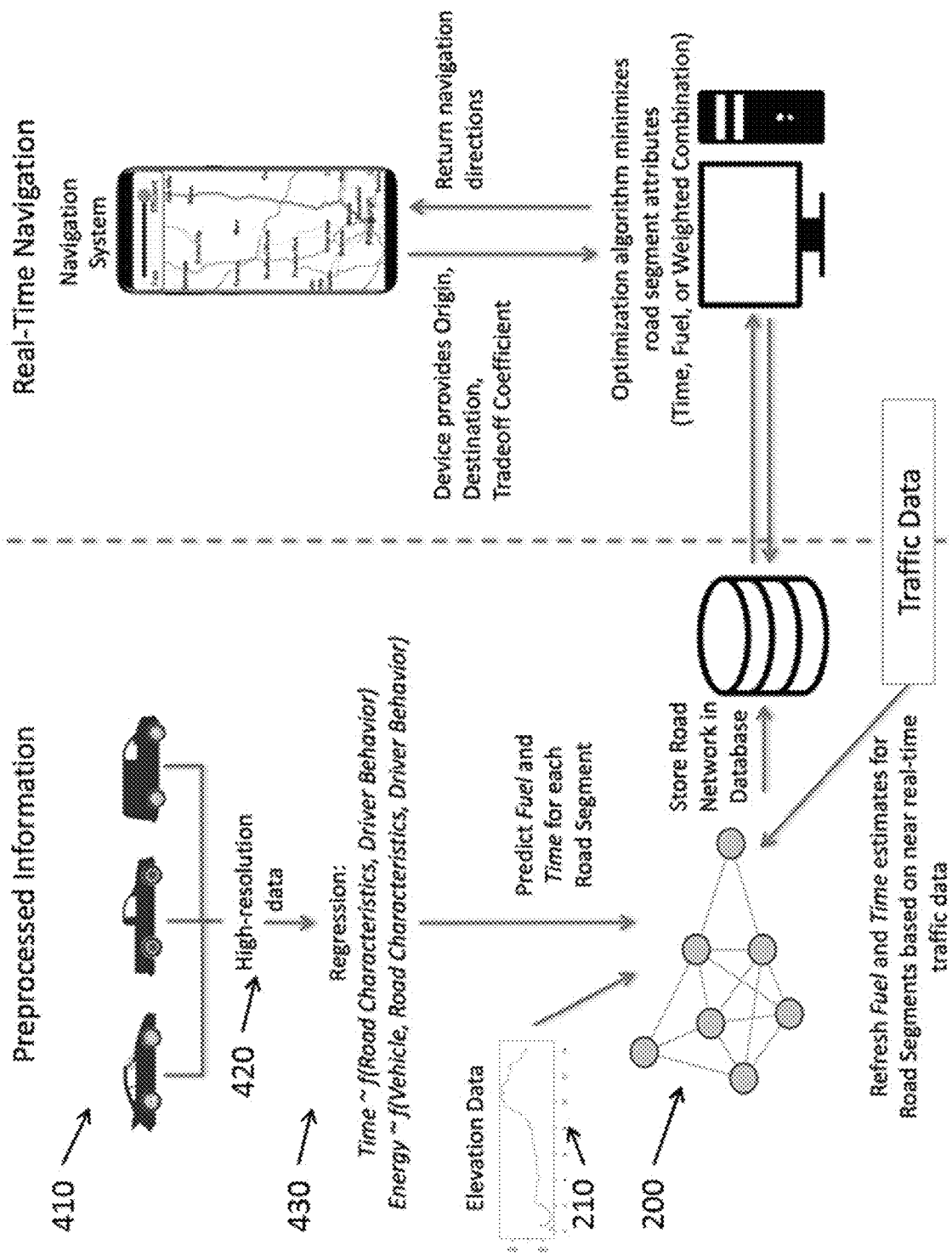
FIG. 4 is a schematic diagram showing models for a route planning system and the planning of routes according to the models according to one embodiment of the present invention.

FIG. 4 is a schematic diagram illustrating the development of models for a route planning system and the planning of routes according to the models according to one embodiment of the present invention.

Figure 5:
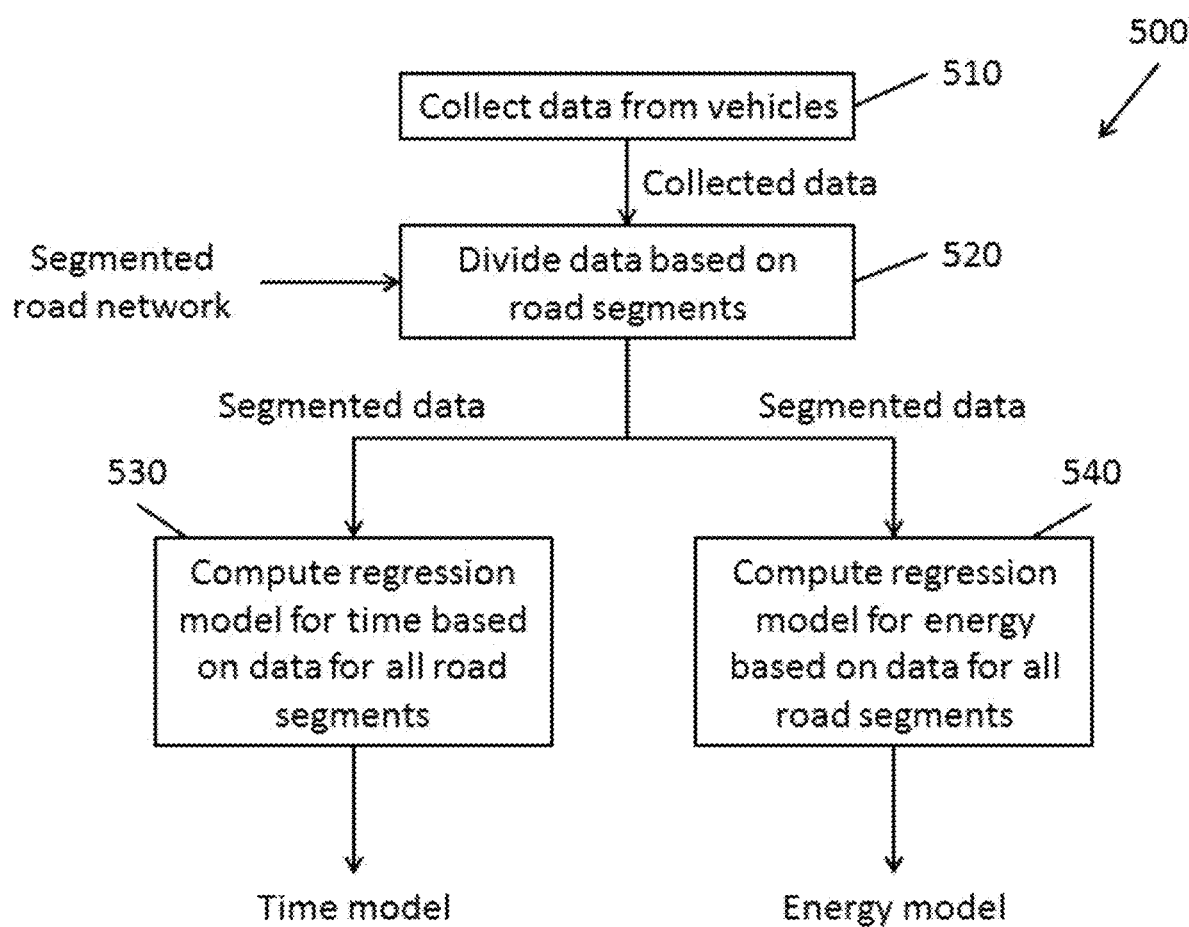
FIG. 5 is a flowchart illustrating a method for computing a regression model according to one embodiment of the present invention.

FIG. 5 is a flowchart illustrating a method for computing a regression model according to one embodiment of the present invention. In some embodiments of the present invention, the method is performed by a model training system, which may be implemented on a computer system including a processor and memory, where the memory stores instructions that, when executed by the processor, cause the processor to perform the particular operations to compute regression models in accordance with embodiments of the present invention.

In operation 510, various data 420 may be collected from vehicles by the onboard data logger 300 from vehicles 410 during their drives (e.g., trips). For example: vehicle speed, engine speed (RPM), odometer, throttle position, and energy use (fuel, battery, or both) may be retrieved from the OBD II connection; longitude, latitude, and altitude may be retrieved from the GPS receiver, and fuel economy or energy efficiency (expressed, for example, in miles-per-gallon in the case of a fuel powered vehicle or miles per kilowatt hour in the case of an electric vehicle) may be computed based on the fuel use and the distance traveled as logged by the GPS receiver or by the odometer. These data may be loaded by the model training system from a database of stored recordings of drives taken by the subject vehicles.

In some embodiments of the present invention, the road network 200 is divided into a plurality of road segments. For instance, the segments may be portions of the road between intersections or other points of interest. In the graph representation shown in FIG. 2, each node in the graph may correspond to an intersection, where the edges that are directly connected to a node represent the road segments connected to the corresponding intersection. As noted above, in some embodiments of the present invention, the graph is represented using directed edges indicating the direction of travel along those edges. Each road segment (e.g., edge) may be associated with road characteristics (e.g., road class, locations of stoplights and stop signs, locations of crosswalks, speed limit, number of lanes, typical traffic load, elevation change, and the like). These data may be loaded from an existing database, or may be collected by the onboard recording system 300 during the drives of the vehicles.

In operation 520, the data collected from the vehicles in operation 510 is divided based on road segments. For example, the GPS coordinates (e.g., longitude and latitude) from the data are used to identify which road segment the vehicle was on during each portion of the drive. Accordingly, the data collected from each vehicle over the course of the drive can be associated with their corresponding road segments.

In operations 530 and 540, statistical techniques are used to characterize travel time and the energy use of vehicles as a function of road and vehicle attributes, environmental factors, and driver style. Generally, in some embodiments of the present invention, the time to traverse a particular segment of the road network is a function of the road characteristics and driver style or behavior (e.g., aggressiveness):

$$\text{Time} \sim f(\text{Road Characteristics}, \text{Driver Behavior})$$

and the energy usage to traverse a particular segment of the road network is a function of vehicle characteristics (e.g., weight and energy efficiency), the road characteristics, and driver behavior (e.g., aggressiveness):

$$\text{Energy} \sim f(\text{Vehicle}, \text{Road Characteristics}, \text{Driver Behavior})$$

As noted above, the Road Characteristics may include information such as road class (highway, secondary road, residential, etc.), speed limits, stop signs and stop lights, and an elevation profile.

Below is one simple embodiment of a regression model, Equation 1 for Time:

$$\text{Time} = \beta_0 + \beta_1 \text{Distance} + \beta_1 \text{Speed} + \beta_2 \text{RoadClass} + \beta_3 \text{NumStops} + \beta_4 \text{DriverStyle}$$

and Equation 2 for Energy Use:

$$\text{Energy} = \beta_0 + \beta_1 \text{Distance} + \beta_2 \text{Speed} + \beta_3 \text{NetElevGain} + \beta_4 \text{NetElevLoss} + \beta_5 \text{NumStops} + \beta_6 \text{Vehicle} + \beta_7 \text{DriverStyle}$$

where Time is the time (e.g., in minutes) to travel over a particular segment of the road network and Energy is the energy use (e.g., in gallons of fuel or fuel equivalency for electric vehicles or combined for hybrid electric vehicles) required to travel the segment, Distance is the length of a road segment (e.g., in miles), Speed is the average speed of the vehicle over the segment (e.g., miles per hour), which may incorporate traffic conditions, NetElevGain and NetElevLoss are the net elevation gained and lost over the road segment (e.g., in feet), NumStops is the number of stops observed over the road segment, and DriverStyle is an indicator variable denoting different driver styles or behaviors (e.g., more or less aggressive driving style, where accelerometer, engine RPM, and/or throttle position data are used to determine driving style), Vehicle is an indicator variable for a specific vehicle or vehicle class (e.g., compact car, full sized car, van, light pickup truck, medium delivery truck, semi-trailer truck, off-road vehicle, EV, HEV, etc.), and may also account for the efficiency of the energy recovery, in the case of HEV or PEV, weight or mass of the vehicle (e.g., whether the semi-trailer truck has a loaded trailer, or whether the delivery truck has a full load of packages). Note that at least some of the values associated with a road segment are direction dependent. For example, if a road segment has an elevation change from one end to the other, then the net elevation gain or net elevation loss values differ (e.g., are opposite) depending on which direction the vehicle is traveling. Likewise, the energy usage along the road segment will differ (e.g., more energy will be used when traveling in the uphill direction along the road segment than in the downhill direction). Accordingly, some embodiments of the present invention represent the different directions of the road segments as different road segments.

In operations 530 and 540, the regression models 430 are computed to fit the data collected from multiple journeys for different vehicles under varied road conditions, topographies, drivers, etc. As noted above, in some embodiments, the road segments correspond to the portions of the road between adjacent intersections. In some embodiments, the collected data are sampled to divide a trip into random length segments (rather than based on segments extending between intersections). The segments of the road network are taken as the unit of observation in regression model 430 (e.g., Equations 1 and 2, above). The observed road segment data are then used estimate the $\beta$ coefficients of the regression model using an ordinary least-squares (OLS) approach or other appropriate statistical technique. Note that each parameter Equations 1 and 2 may actually correspond to a vector of parameters (e.g., the "Vehicle" parameter may include, for example, a vehicle type, a weight, and an energy efficiency parameter) and, accordingly, the corresponding $\beta$ coefficients may correspond to a vector of coefficients, where a dot product is computed between the vector $\beta$ and the vector parameter.

In more detail, in operation 530, a regression model for time is computed using the data collected over all of the road segments. The travel time of a vehicle during the course of a particular trip can be computed based on the timestamps of the data points corresponding to when the vehicle enters and exits the road segment (e.g., at a first end and second end of the road segment). The time calculation is performed for each trip across the road segment represented in the collected data 420. Likewise, time calculations can be performed for all trips across all traveled road segments in the road network 200. The β parameters of the time regression model can then be computed through standard regression techniques based on the other data representing the driving style loaded from the collected data and the road characteristics loaded from road network 200 data.

Likewise, in operation 540, a regression model for energy use is computed using the data collected over all of the road segments. The energy use of each vehicle can be computed based on the change in fuel level or change charge level of the vehicle (e.g., as reported through the OBD II system). In a similar manner, the energy usage between entry into the road segment and the exit from the road segment is calculated for each road segment in the road network 200, and the β parameters of the energy regression model can be computed through standard regression techniques.

In some embodiments of the present invention, models are constructed using high-resolution data (~one-second time resolution) collected from a vehicle's on-board computer (including time, distance, speed, throttle position, and energy use) and a GPS trace (including latitude, longitude, and altitude). Each trip path is overlaid onto a database of the road network that includes road characteristics such as road class, speed limit, and the presence of stop lights or stop signs. The observed vehicle trip data were broken into small trip segments and were divided into a training dataset and a validation dataset. Regression is performed using a gradient boosting tree model (see, e.g., Nielsen, Didrik. *Tree Boosting With XGBoost—Why Does XGBoost Win "Every" Machine Learning Competition?*. MS thesis. NTNU, 2016.). The model is fit using the training dataset and the accuracy of the model is tested by predicting time and energy consumption for road segments in the validation set, which is then compared against the observed data to validate the model.

In more detail, in one embodiment, training data for training the models is collected directly from the vehicle includes vehicle data including: Engine Coolant Temperature (° C.), Engine RPM (RPM), Vehicle Speed (km/hr), Intake Air Temp (° C.), Air Flow Rate from Mass Air Flow Sensor (grams/s), Absolute Throttle Position (%), Idle Time (s), Fuel Consumption from Mass Air Flow Sensor (mL), and Fuel Economy from Mass Air Flow Sensor (MPG), and GPS data including: Latitude, Longitude, Altitude, Velocity, Heading, Date, Time, FixType, and NumSats.

In some embodiments, the training data collected from the vehicle is converted to a more easily interpreted set of data, including: Time, Latitude, Longitude, Distance (miles), Altitude, Revolutions Per Minute, Speed (miles/hr), Throttle (%), Mass Air Flow Sensor (grams/s), Cumulative Time, Miles Per Gallon, Fuel Burned (gal), Trip Number, Cumulative Distance, Altitude Gain, and Altitude Loss.

In some embodiments, the list of predictors is then further reduced to match the predictors available on the road network database, which are as follows: Elevation Gain (ft), Elevation Loss (ft), Distance (miles), Speed (miles/hr), and Road Class. In some embodiments, the Road Class for each segment is one of the following: residential, motorway, motorway link, primary, primary link, secondary, secondary link, tertiary, tertiary link, trunk, and trunk link.

The training data also includes the dependent variables, Energy Used (e.g., gallons of gasoline or kilowatt hours of electricity) and Time Value (e.g., minutes to travel the segment) calculated for each segment as described above.

In some embodiments, road network data is used as test data. In one experimental embodiment, the road network database includes high resolution positional data on every road in the greater Pittsburgh area. Attributes are then assigned to road segments based on publicly available data, where these attributes (or features) include: Elevation Gain (ft), Elevation Loss (ft), Distance (miles), Speed (miles/hr), and Road Class (where Road Class is a class selected from the same list as above for the training data).

In one embodiment, the training data is divided into segments where each segment has a random length between 0.001 miles and 0.1 miles. In one embodiment, the road class predictor is also one-hot encoded in order to make it compatible with the gradient tree boosting regression model. In another embodiment, the road class predictor is represented using a length n vector of values, iteratively learned using a deep neural network, to represent the proportional relationship between each road class in the dependent variable.

As noted above, in one embodiment of the present invention, a gradient boosting tree model is employed for the regression task. To tune the hyperparameters of the model, the training data are broken into 10-fold equal size subsamples where a single subsample is used for validation. The cross-validation process is repeated until the error metric continues to increase for 30 consecutive rounds and the resulting number of rounds is used in the model training. All 10-fold subsamples are used as validation sets in the process. The loss function used is Root Mean Square Error (RMSE). The regularization parameters are as follows: The maximum depth of single tree is set to 3 so the model does not become too complex. The learning rate was set to 0.01. A subsampling ratio of 0.5 is used so the algorithm randomly samples half of the training data prior to building trees. Predictions are then computed for time spent (time consumption or time value) and energy used (e.g., fuel burned or electricity used, sometimes referred to herein as energy consumption) for each road segment in the road network database. These predictions are then set as attributes on the edges of the road network.

Details of techniques for training a gradient boosting tree model can be found, for example, in the above-referenced Nielsen, Didrik. *Tree Boosting With XGBoost—Why Does XGBoost Win "Every" Machine Learning Competition?*. MS thesis. NTNU, 2016. More generally, tree-based regression can be performed through the following technique (Kuhn, Max., and Kjell Johnson. *Applied Predictive Modeling*. New York: Springer, 2013. Print.).

For tree depth, D=3, and number of iterations, K
Compute the average response, y, and use this as the initial predicted value for each sample
for k=1 to K do:
    Compute the residual, the difference between the observed value and the current predicted value, for each sample
    Fit a regression tree of depth, D=3, using the residuals as the response
    Predict each sample using the regression tree fit in the previous step
    Update the predicted value of each sample by adding the previous iteration's predicted value to the predicted value generated in the previous step
end In still other embodiments of the present invention, the trained time consumption model and the trained energy consumption model include trained neural networks. In some embodiments of the present invention, the training data, as described above, are supplied as inputs to a neural network, such as a multi-layer perceptron network where the weights of connections between the neurons are trained by applying the backpropagation algorithm using the training data set (described above). The neural network may be validated using the validation data set.

Computing Routes Using the Models

Figure 6:
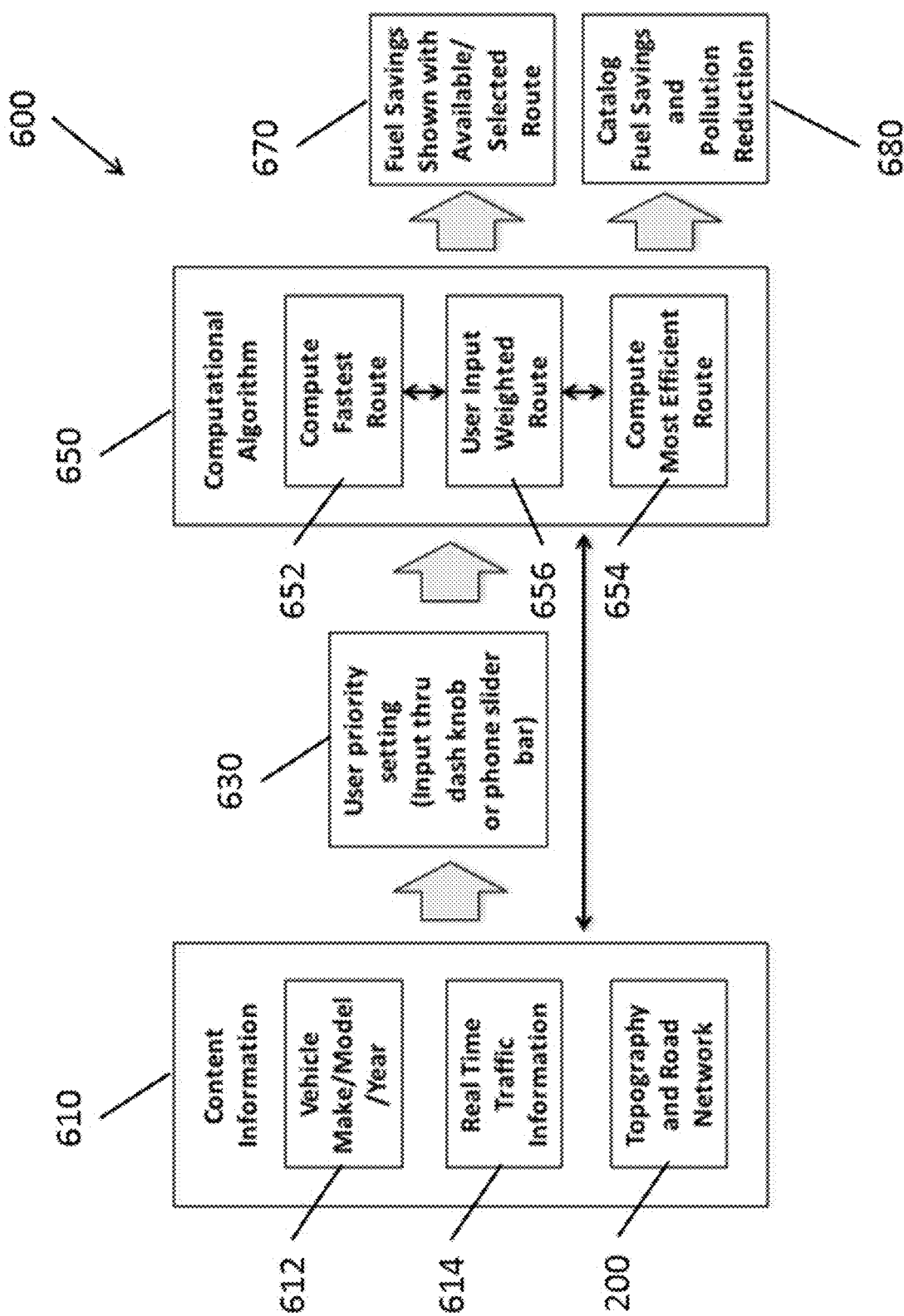
FIG. 6 is a block diagram of functions illustrating an onboard route planning device according to one embodiment of the present invention.

FIG. 6 is a functional block diagram illustrating a route planning system 600 according to one embodiment of the present invention. Referring to FIG. 6, content information 610, including static information such as vehicle make, model, and year 612, and topography and road network information 200 is supplied along with dynamic information such as real-time traffic information 614 and weather information. In addition, a user priority setting 630 of a preference or priority between time efficiency versus energy efficiency is received through a user interface such as a knob on a dashboard of a car, a control (e.g., a slider bar) in the graphical interface of an application running on a smartphone, or a user interface in a web browser or application running on a computer. In some embodiments, the user provides a destination to navigate to. In some embodiments, the destination and the user preference are set by different entities (for example, a passenger in the vehicle may set the destination, but the preference or priority may be set remotely by an entity who is managing the vehicle). In some embodiments, the current position of the vehicle, as reported by an on-board GPS device, is used as the "origin" position. In some embodiments, a user also provides an origin position (e.g., to compute routes from a different starting location). The content information 610 and the user priority setting 630 are supplied to a computational algorithm module 650, which applies the previously computed models 430 for predicting time value (e.g., time consumption) and energy usage (e.g., energy consumption) for various road segments to compute a fastest route 652, compute a most energy efficient route 654, and compute a user input weighted route 656 based on a best match to the weights specified by the user priority setting 630.

According to one embodiment, the results from the regression model (Equation 1 and 2, as configured by the computed β values) are used by the computational algorithm module 650 to predict the time and energy use required to travel each road segment in a road network 200 from the origin position to the destination position in the road network; to improve computational speed, the road network was truncated to the region surrounding the route. FIG. 2 illustrates an example of a road network made up of seven nodes (e.g., intersections) and fourteen edges (e.g., segments of the road between the intersections, where the edges in FIG. 2 are depicted as undirected edges). Each road segment has known attributes, including distance (miles), speed limit (and/or road class, which may be used to estimate a speed limit or typical speed), and a series of geo-coordinates (latitude and longitude); the geo-coordinates are used in conjunction with elevation data to establish an elevation profile for each road segment. Each road segment may also be associated with its name (e.g., its street name) and street address numbers associated with the segment (e.g., a list of buildings and their assigned numbers and the corresponding geo-coordinates locations of those buildings and/or a range of street numbers between the ends of the road segment). The number of stops is derived from node attributes, which include indicators for stop signs and stop lights. The origin position and the destination position may be represented as nodes in the network (e.g., intersections) or may be represented as locations along an edge between two nodes (e.g., a location at a particular street address along a part of a road segment).

When predicting the time required to travel a particular road segment (the time consumption), the road characteristics for the particular road segment are loaded from the road network database. In addition, dynamic road conditions (e.g., current average speed based on traffic data 614 and road closures) are also loaded from a traffic data source (for example, the current average speed may override the "Speed" parameter of the time model, which may otherwise use the static speed limit associated with the particular road segment). Accordingly, the computational algorithm module 650 calculates the time required to travel each road of the road network 200.

Figure 7:
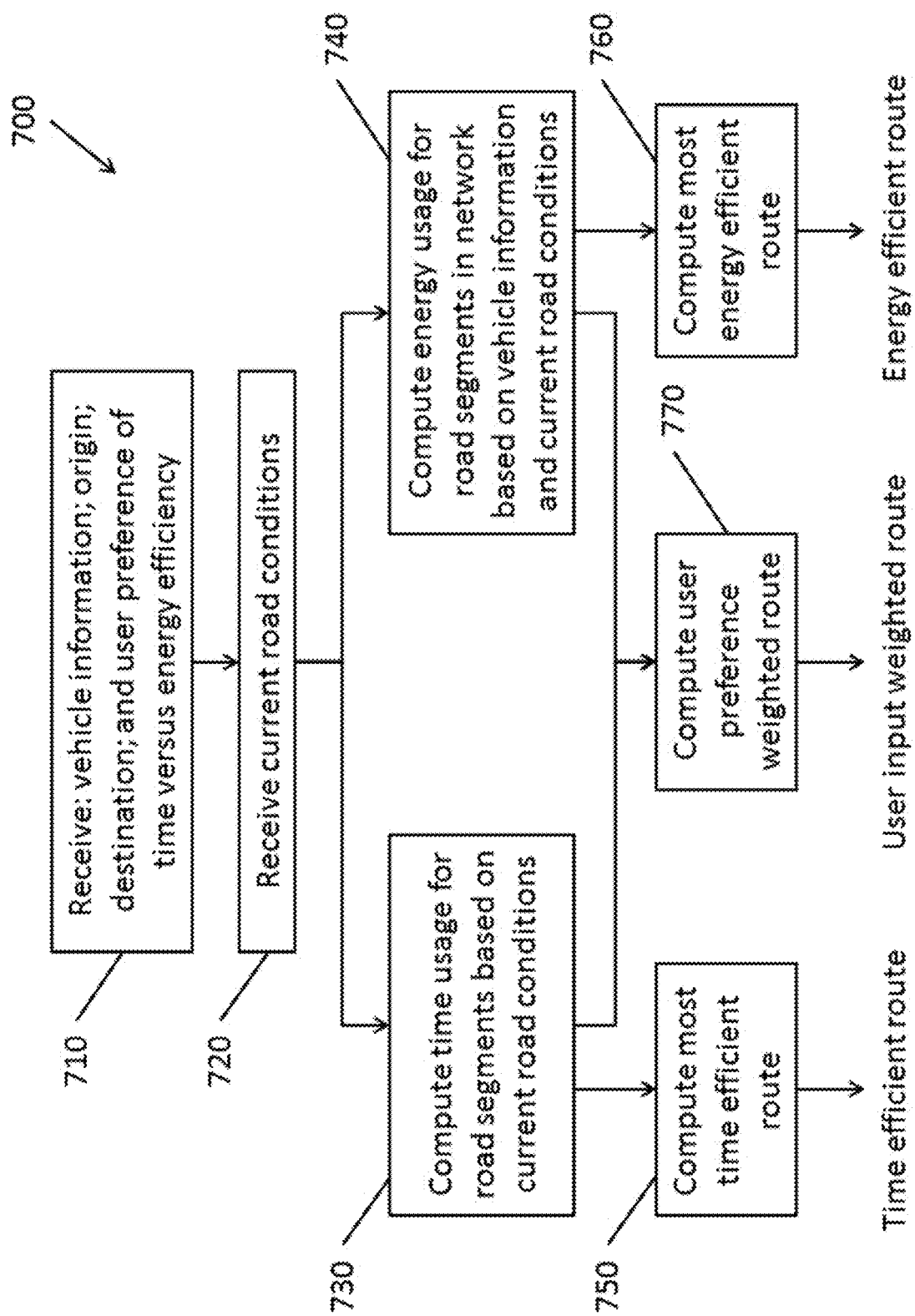
FIG. 7 is a flowchart of a method for calculating routes according to one embodiment of the present invention.

FIG. 7 is a flowchart of a method for calculating routes according to one embodiment of the present invention. In operation 710, the computational algorithm module 650 receives input data particular to the current routing request, including vehicle information (e.g., make, model, and year of a vehicle and/or details about the current weight or mass of the vehicle and performance characteristics of the vehicle, such as fuel efficiency and fuel level or energy efficiency and state of charge), an origin to start the route from (e.g., the current position of the vehicle), a destination (e.g., where the route should end), and a user preference between time efficiency and energy efficiency.

In operation 720, the computational algorithm module 650 receives current (dynamic) road conditions (e.g., the traffic data 614). In operation 730, the computational algorithm module 650 computes the time usage (or time consumption) for road segments based on the time model (e.g., Equation 1) of the models 430. For example, the road characteristics loaded from the road network database 200 and the dynamic conditions are supplied as parameters to Equation 1 in order to compute an estimated time consumption. In addition, a Driver Style can be automatically and dynamically determined based on the captured accelerometer, engine RPM, and/or throttle position data.

Similarly, when predicting the energy usage (or energy consumption) for traveling a particular road segment in operation 740, the computational algorithm module 650 loads the data for the "vehicle" parameters of the energy model from known characteristics of the vehicle for which the route is being planned. As noted above, the vehicle information may include make, model, and year of the particular vehicle, in which case information about, for example, the mass (or weight) of the vehicle, its energy efficiency profile, and the like, can be automatically loaded from a database of vehicles. In some embodiments of the present invention, one or more of the vehicle parameters is supplied from the vehicle (e.g., a reported current mass of the vehicle, based on current load, such as in the case of a cargo transport vehicle). In one embodiment, vehicle parameters, road characteristics (e.g., net elevation gain, net elevation loss, and number of stops) loaded from the road network database 200, and the dynamic conditions (e.g., traffic information) are supplied as parameters to Equation 2 to compute an estimated energy usage for the vehicle over the road segment.

According to one embodiment of the present invention, the computational algorithm module 650 computes three routes in operations 750, 760, and 770. In operation 750, the computational algorithm module 650 computes the fastest route 652 using the predicted time values for each road segment. For example, a route planning algorithm (such as Djikstra's algorithm, the A* pathfinding algorithm, or a variant of the D* incremental search algorithm) using the accumulated predicted time spent on each road segment as a metric to be minimized when searching for a fastest route from the origin to the destination. Likewise, in operation 750, the computational algorithm module 650 computes the most energy efficient route 654 using the predicted energy usage values for each road segment. For example, a route planning algorithm using the accumulated predicted energy used on each road segment as a metric to be minimized when searching for a most energy efficient route from the origin to the destination. In some circumstances, the most energy efficient route and the fastest route are the same route (e.g., when there is only one available road).

In addition to computing the fastest and the most energy-efficient routes in operations 750 and 760, one aspect of embodiments of the present invention relates to computing a route based on input from drivers or users (e.g., using a knob, dial, or slider bar) to indicate their real-time preferences for reaching their destination quickly or reaching their destination in the most energy-efficient manner, or a weighted preference between the two extremes. One embodiment of this invention uses a utility function to combine and weight the time and energy attributes for each road segment using input from the driver through the position of the knob, dial, or slider bar. For each road segment, a Balanced attribute ($B_{Time+Energy}$) or weighted attribute is calculated using Equation 3 as follows:

$$B_{Time+Energy} = C_{Tradeoff} \times \text{Time} + \text{Energy}$$

where time and energy are the expected time (e.g., minutes) and energy use (e.g., gallons of fuel or fuel equivalency) to travel a road segment. $C_{Tradeoff}$ is the tradeoff coefficient (e.g., gallons/minute), which reflects the driver's willingness to trade between time and energy, e.g., accept a slower route in order to save energy. The tradeoff coefficient has one of a plurality of values (e.g., is a continuous value or a substantially continuous value, given constraints of digital computing systems) that is changed by the driver using the input, e.g., a knob, dial, or slider bar, to reflect their real-time preferences. Embodiments of the present invention allow a user to specify a tradeoff preference at any one of a plurality of values between an energy efficient route and a fastest route, as opposed to a setting that merely has two values: energy efficient and fastest. In some circumstances, such as where there is only one road available between two places, the computed user input weighted route is the same as the most energy efficient route or the same as the fastest route (or all three may be the same route).

However, embodiments of the present invention are not limited to computing three routes. For example, in some embodiments of the present invention, only the user weighted route is computed. In some circumstances, the user preference may be weighted entirely to time or weighted entirely to energy efficiency, in which case no separate calculation of a weighted route in operation 770 is needed.

In some embodiments of the present invention, rather than computing the estimated time and energy usage for each road segment in the network, a route planning algorithm such as the A* ("A star") "best-first" search algorithm (or, as other examples, using Djikstra's algorithm or a variant of the D* algorithm), using the accumulated predicted time and energy usage values as the evaluation metrics for the search. In some embodiments, when calculating the user input weighted route, the Balanced attribute of Equation 3 is used as the evaluation metric for the route planning algorithm.

Figure 9:
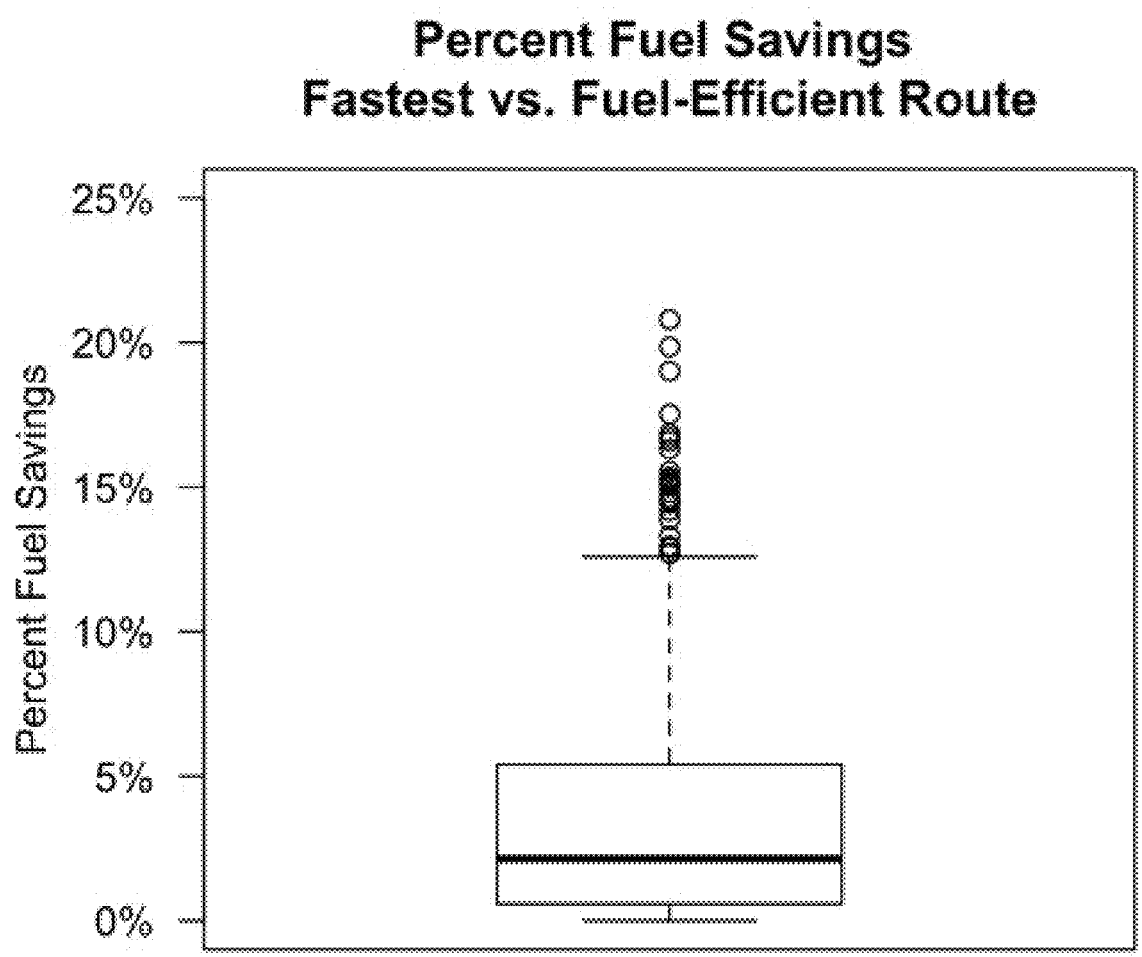
FIG. 9 shows the results of calculated fuel savings between fastest route and most fuel efficient route based on over one thousand commuter routes in the Pittsburgh metropolitan region.

FIG. 9 depicts an example with three routes between a particular Origin position and a particular Destination position according to one embodiment of the present invention. The image also shows a notional slider used by the driver or user to indicate their priority for energy efficiency or speed. If the dial is turned all the way to the left, the route-finding algorithm optimizes on time only and Route A is selected. If the dial is turned all the way to the right, the algorithm optimizes on energy (e.g., fuel or electricity) only, and route C is selected. If the knob is not at one of the two extremes then the Tradeoff Coefficient is used in the utility function to calculate a weighted combination of time and energy (fuel or electricity). From the left-most position, as the driver turns the knob to the right, the Tradeoff Coefficient decreases in value reflecting a greater priority for energy (fuel or electricity) savings and reduced emissions over time. In this example, once the knob is turned such that Coeff<0.02 gal/min, then Route B is the preferred choice.

An analysis of more than 1,000 commuter routes in the Pittsburgh metropolitan region found significant fuel savings are available through alternative routing. As shown in FIG. 9, the bottom quartile (25% of routes) showed no difference—the fastest route and most fuel-efficient route were the same. The middle quartiles (50% of routes) offered 1% to 6% fuel savings over the fastest route. The top quartile (25% of routes) showed 6% to 22% fuel savings over the fastest route. This analysis shows that many everyday routes traveled by commuters offer potentially significant fuel and emissions savings. Initial examination of other metropolitan areas show similar fuel savings are achievable, sometimes for different reasons, e.g., in Kansas City there are inefficiencies of routing to highways which often include both backtracking and operation of vehicles at speeds that are suboptimum, efficiency-wise.

Figure 10:
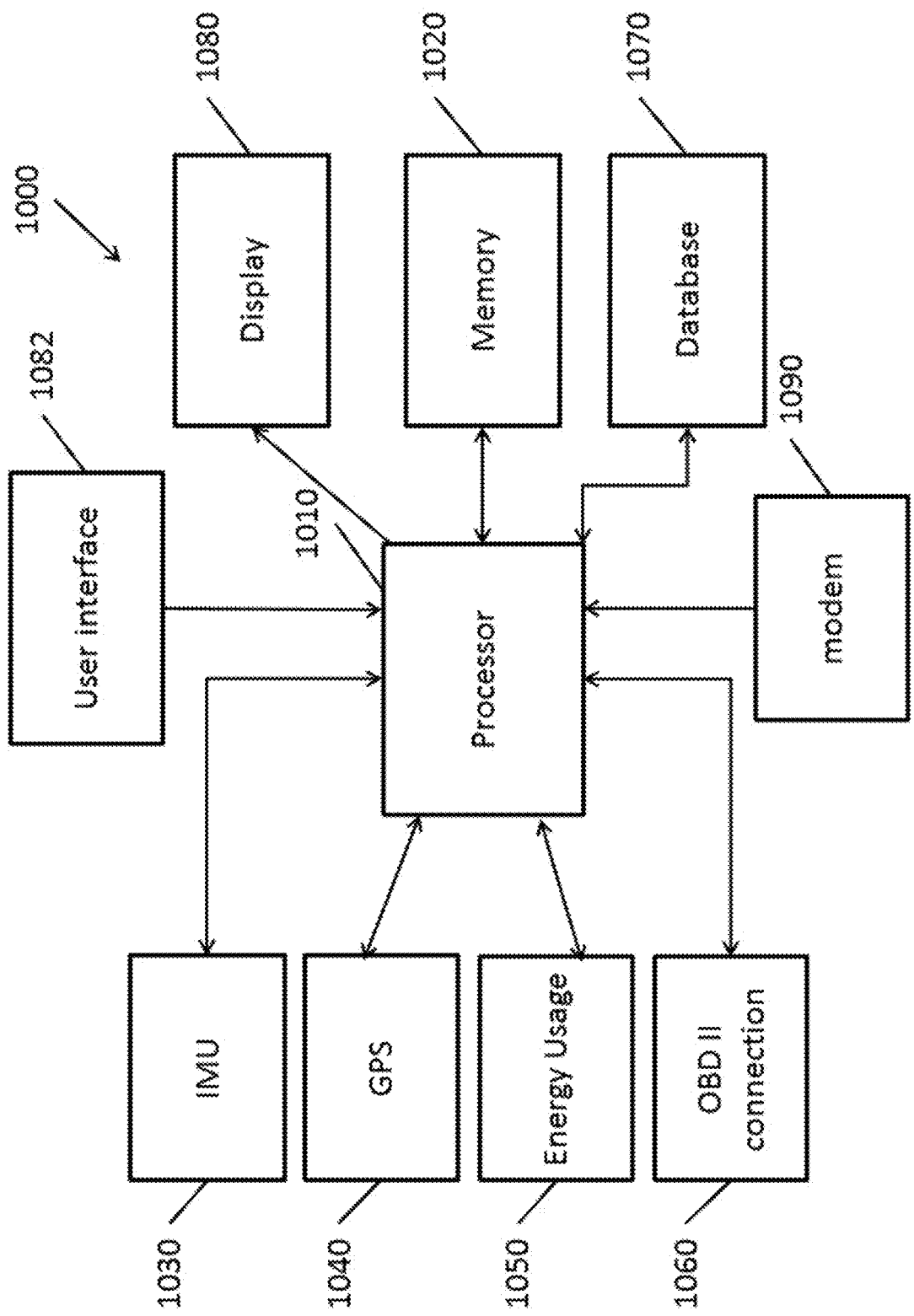
FIG. 10 is a block diagram of an on-board navigation system according to one embodiments of the present invention.

As noted above, in some embodiments of the present invention, the route planning device includes an onboard route planning device that is located in the vehicle for use by the driver or passenger of the vehicle. FIG. 10 is a block diagram of an onboard route planning device according to one embodiment of the present invention. As shown in FIG. 10, the onboard route planning device 1000 includes a processor 1010 coupled to sensors including an inertial measurement unit (IMU) 1030, a GPS receiver 1040, energy consumption sensors 1050, and an OBD II connection 1060 to collect data from the vehicle. The onboard route planning device 1000 may also have memory 1020 for storing program instructions and other data, as well as a database 1070 (which may be stored in the memory 1020) containing the road network database 200 described above. A display 1080 may be used to show the currently planned route to the user, and a user interface 1082 (e.g., a touch sensitive panel coupled to the display and/or physical buttons, switches, dials, and the like) may be provided to receive user input such as indicating a Destination and a user preference for the weighting of time and energy in the route planning. The onboard route planning device 1000 may also include a communications device or modem 1090 (e.g., a cellular modem) for retrieving real-time or near-real time traffic information from a remote source over a data network.

In some embodiments of the present invention, the resulting calculated route or routes 670 are then supplied to the navigation system of the vehicle. As noted above, the navigation system of the vehicle (e.g., configured to compute routes for the vehicle) may be physically located onboard the vehicle, may be physically located remote from the vehicle (e.g., in a data center of a cloud computing service and/or in a central management location in the case of the management of a fleet of vehicles), or may be distributed between onboard (local) components and remote components.

In some embodiments, the resulting calculated route or routes can then be presented to the user. In the case of an onboard route planning device 1000, the calculated routes may be presented on the display device 1080. As noted above, in some embodiments of the present invention the user preference is specified remotely, e.g., set by a human operator or automatically set based on monitoring conditions of a fleet of one or more vehicles. In such instances, the routes may be displayed on a remote computing device rather than on a display onboard the vehicle.

In some embodiments, the resulting calculated route (e.g., the user input weighted route) is used to automatically configure an autonomous driving system of the vehicle to drive the vehicle along the calculated route.

In some embodiments, the results 670 include estimates of fuel savings by choosing the energy efficient route instead of the fastest route and/or the user input weighted route.

In some embodiments of the present invention, the route is periodically (e.g., continuously) recalculated based on changes in the dynamic conditions of the road network 200 and/or dynamic conditions of the vehicle. For example, the calculated route may change if unexpected traffic or a road closure has made other routes preferable. Alternatively, changes in the weight or mass of a vehicle (e.g., after making a delivery) may change the energy efficiency of traversing particular road segments (e.g., climbing a hill may be slightly less energy intensive than with a full load). As such, a road segment that may have been heavily penalized due to energy inefficiency (but beneficial due to time efficiency) may now be acceptable based on the user preference of time versus energy efficiency.

Furthermore, in some embodiments of the present invention, the route is recalculated when the driver or user changes the user preference between time efficiency and energy efficiency. For example, external factors may cause delays that require that the vehicle to arrive at the next destination sooner, in order to make up for lost time, thereby requiring a shift to prioritize time efficiency (reduce time consumption). Likewise, being ahead of schedule may cause the user to choose to shift preferences toward energy efficiency.

Figure 11:
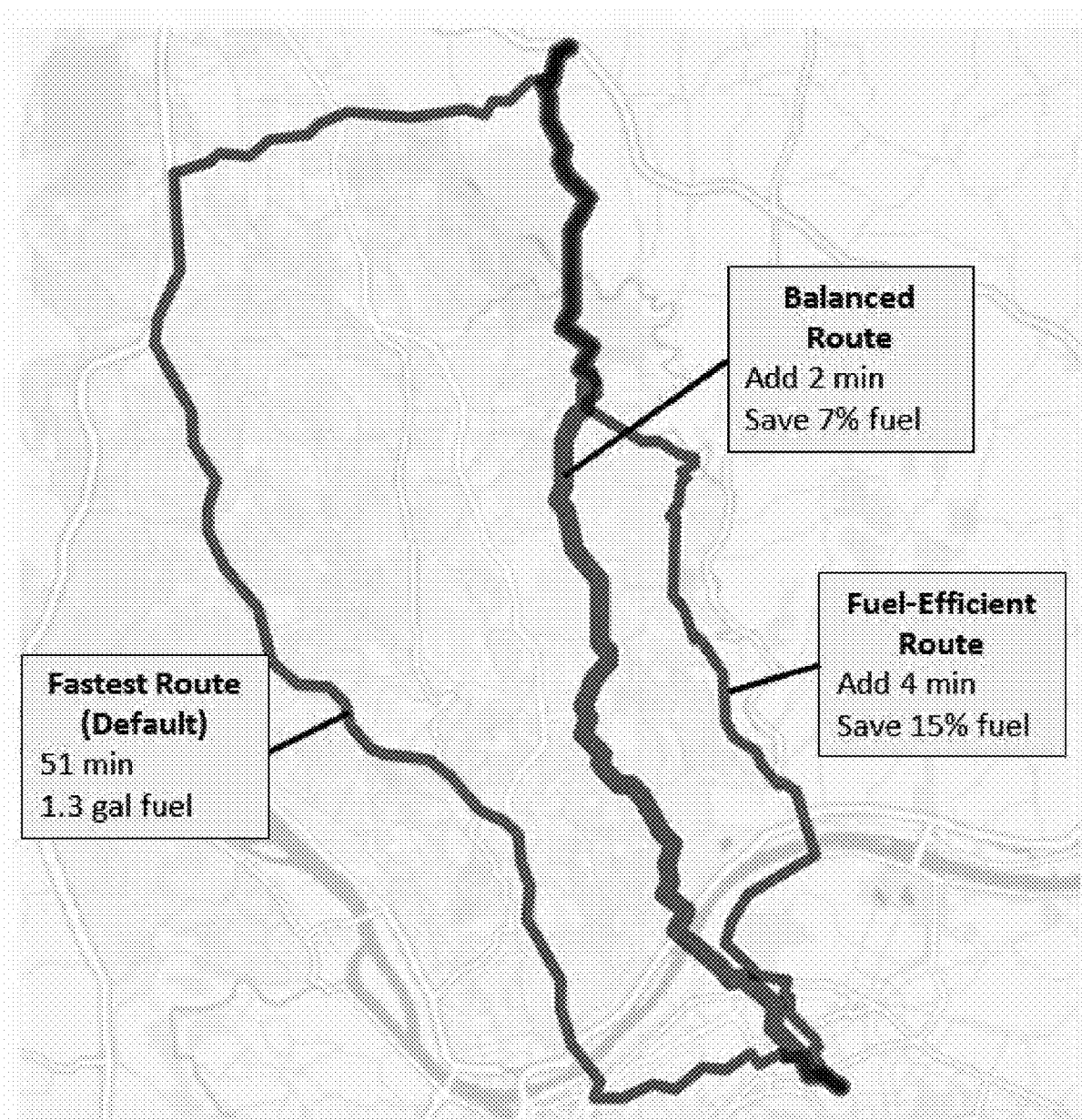
FIG. 11 depicts the fastest, the most fuel efficient routes, and user input weighted ("balanced" or "preferred") route that would be determined with the use of the device in a user interface according to one embodiment of the present invention.

FIG. 11 shows one embodiment of the invention with an example commuter route of roughly 50 miles. Three routes are shown: the fastest route, the most energy efficient, and a weighted route, which is derived through a weighting function that incorporates the user's real-time preferences for time and fuel savings (the weighted route may also be referred to herein as, for example, a preferred route, a balanced route, and a user input weighted route). In this case, the fastest route is a significantly longer distance as the driver is routed onto a freeway. The more energy efficient route is estimated to save 15% of fuel, largely due to the shorter distance, but will take 4 minutes (~8%) longer. The weighted route is a compromise between the two, offering a more modest fuel savings (7% savings from the fastest route) with less of a time penalty (2 minutes slower than the fastest route). In this embodiment of the invention, the driver could use a knob or digital slider bar (e.g. FIG. 1) to indicate their preferences for reaching their destination most quickly (slide left), to improve fuel efficiency (slide right) or to select a weighted route (slide to the middle). In this example embodiment, the tradeoffs between time and fuel for each route are clearly displayed, allowing the user to make a more informed decision about their route choice. Accordingly, FIG. 11 depicts the presentation of additional relevant information about the time and energy tradeoffs between the route options.

In one embodiment, the knob or slider bar (e.g. FIG. 1) specifies a value in a continuous range that would be used to re-compute the weighted route to incorporate the user's real-time preferences. A slider position of 30%, for example, would indicate a greater preference for time savings and a 70% value on the slider bar would indicate a greater preference for fuel savings. As the user adjusts the knob or slider bar, new route options would be re-computed and displayed to the user.

In some embodiments, in addition to providing user prioritized selections of routes and display near real-time energy (fuel or electricity) savings, the onboard route planning device accumulates energy savings data and estimates the pollution (e.g., $CO_2$, NOx, SOx and PM) reduced when requested by the user. These savings in energy (e.g., fuel or electricity) and reductions in pollution can be catalogued and stored within the device continuously as alternative routes are selected, until the user resets the internal storage on the system, and the catalogued savings in energy and pollution reduction 680 can also be displayed to the user.

As noted above, in some embodiments of the present invention, the route planning system is implemented, in part or in whole, in a local computing device that is integrated into a vehicle (e.g., an on-board navigation system) or implemented in an application running on a portable computing device (e.g., a smartphone). Furthermore, according to some embodiments of the present invention, the route planning system may be implemented in a remote computing device (e.g., a cloud computing device or a server). Accordingly, the functional blocks shown in FIG. 6 may be implemented in a computing device local to the vehicle, one or more remote computing devices, or combinations thereof and, in particular, as sets of instructions stored in the memories of the computing devices and executed by the associated processors to perform the functions.

To summarize, aspects of embodiments of the present invention are directed to an approach for calculating an energy-efficient route from an Origin to a Destination which takes into account specific characteristics of vehicle, the terrain elevation of alternative routes, speed on these routes, and near real-time traffic.

Fixed or substantially constant information ("static" information) relating to specific vehicle performance and the road network (e.g., elevation profile of the roads) can be pre-processed and combined with near real-time traffic for a refined estimate of time and/or energy use, which further improves the estimate. The routes and the network data are updated in near real-time as new traffic-based information is integrated into the route planning (e.g., made available through centralized public source or sourced through other drivers/users which are used to update near-real time routing information).

The driver or user of the mobile platform can select among available routes to optimize time or energy use, or provide a compromise between the two using a weighting function that provides a range of route available according to this preference. The range of routes available are selected using a simple interface such as a knob, dial, or slider bar, that swings between time and energy use, and weighted in-between routes.

In some embodiments, the information on both time and energy use of the route options are provided using a graphic display on the device, which can serve to inform the driver or user with near real-time information. Time and energy use and, if specified, pollution reduction results, are summarized on the graphic display. The graphics display informs users of the tradeoffs between available routes, allowing them to make a better-informed decision (e.g. the example illustrated in FIG. 5 informs users that Route B will take 1 minute longer but save 10% of fuel compared to Route A). Continuous storage of the fuel saving and pollution reductions ($CO_2$, $NO_x$, $SO_x$ and PM) are maintained in the device until the user clears the memory. In additional to or in lieu of fuel savings, these environmental savings can be reported, at the user's discretion.

In some embodiments, the geographic location of nearest energy refueling and recharging stations may be available on the display at driver or user request. One embodiment of this invention provides route optimization that minimizes the risk of running out of fuel (or battery charge, in the case of electric vehicles), with the location of refuel or recharge stations incorporated into the route planning.

As such, aspects of embodiments of the present invention may be used to improve the quality of automatically planned routes by optimizing for time and/or energy efficiency in accordance with vehicle characteristics, attributes of the road networks, and real-time traffic conditions.

In the context of private cars, embodiments of the present invention may also allow drivers to customize the routes suggested by navigation systems in accordance with the preferences of the drivers based on time or energy efficiency and/or reduced emissions goals, in contrast to other navigation systems which may merely optimize based on time.

In the context of commercial vehicles and/or delivery vehicles, aspects of embodiments of the present invention can improve route planning, thereby allowing for fleet-wide cost savings in terms of energy usage, with the option to temporarily speed up delivery by transitioning to a mode that optimizes for time in order to catch up if deliveries are delayed. Still other embodiments of the present invention may be integrated into navigation systems of autonomous vehicles, thereby allowing operators of the autonomous vehicles to specify preferences with regard to time (speed) and/or energy usage and pollution of the autonomous vehicles, selecting routes that best meet those preferences.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, embodiments of the present invention are described above as if the procedures and algorithms for computing routes in accordance with, for example, the road network data, the vehicle information, and the real-time traffic data, were performed entirely by a processor of an onboard route planning device. However, embodiments of the present invention are not limited thereto. For example, the route planning may be performed remotely (e.g., by a server in communication with the onboard route planning device), where the route planning device may merely transmit data regarding the location and speed of the vehicle, as well as any user preferences (e.g., position of the time versus energy knob) to a remote server for computing a route. As another example, the road network database may be stored remotely (e.g., on a server) and accessed by the route planning device over a network. The route planning device may also include a plurality of different processors (e.g., a separate graphical processing unit) which may process various portions of the algorithm.

Furthermore, while some embodiments of the present invention are described in the context of a separate, stand-alone route planning device that may be placed into a car and connected to the car through, for example, an OBD II connection, embodiments of the present invention are not limited thereto. For example, in some embodiments, the route planning aspects may be integrated into and/or controlled from an interface integrated into a vehicle, such as being integrated into a computer system of a car (e.g., replacing or supplementing the navigation algorithm used by an integrated navigation system of a vehicle).

What is claimed is:

1. A system for generating navigation routes, the system comprising:
   a processor;
   a memory coupled to the processor, the memory storing instructions that, when executed by the processor, cause the processor to:
      receive an origin position, in a road network;
      receive a destination position, in the road network;
      receive one or more user preferences from a user interface device, where each user preference is a tradeoff value set to one of a plurality of tradeoff values representing different compromises between time efficiency and energy-efficiency;
      compute a travel time value for each of a plurality of road segments of the road network using a time consumption model;
      compute an energy consumption for each of the plurality of road segments of the road network using an energy consumption model;
      identify one or more weighted routes from the origin position to the destination position based on the travel time value and the energy consumption for the road segments and based on the user preference resulting in a compromise between a fastest route and a most energy efficient route in accordance with the one or more user preferences; and
      display the identified one or more weighted routes on the user interface device.

2. The system of claim 1, wherein the memory further stores instructions that, when executed by the processor, cause the processor to:
   compute a most time efficient route based on the time consumption model;
   compute a most energy efficient route based on the energy consumption model; and
   compute the identified one or more weighted routes based on a weighting of the travel time value and energy consumption derived from real-time data from a vehicle and the user input tradeoff value resulting in the compromise between the fastest route and the most energy efficient route.

3. The system of claim 1, further comprising a geographic positioning system onboard a vehicle, and
   wherein the origin position corresponds to a current position of the vehicle, as provided by the geographic positioning system.

4. The system of claim 1, wherein the user interface device comprises a display device of a navigation system onboard a vehicle, and the identified one or more weighted routes are displayed on the display device.

5. The system of claim 1, wherein the memory stores instructions that, when executed by the processor, cause the processor to control a navigation system of a vehicle remotely, and wherein the identified one or more weighted routes are displayed on a computing device remote from the vehicle.

6. The system of claim 1, wherein the memory further stores instructions that, when executed by the processor, cause the processor to supply the one or more weighted routes to a navigation system of a vehicle configured to control an autonomous driving system of the vehicle to drive the vehicle along the identified one or more weighted routes.

7. The system of claim 1, wherein memory further stores instructions that, when executed by the processor, cause the processor to compute the travel time value for each of the road segments by supplying a plurality of parameters to a time consumption model, the plurality of parameters being based on at least one of:
   static information associated with each of the road segments; and
   dynamic information associated with each of the road segments.

8. The system of claim 7, wherein the static information associated with each road segment of the road segments comprises:
   a length of road segment;
   a speed limit along the road segment;
   a road class of the road segment; and
   a number of stops along the road segment, and
   wherein the dynamic information associated with the road segment comprises traffic data.

9. The system of claim 1, wherein memory further stores instructions that, when executed by the processor, cause the processor to compute the energy consumption for each road segment of the road segments by supplying a plurality of parameters to an energy consumption model, the plurality of parameters being based on at least one of:
   static information associated with the road segment;
   dynamic information associated with the road segment;
   static information associated with a vehicle; and
   dynamic information associated with the vehicle.

10. The system of claim 9, wherein the static information associated with the road segment comprises:
    a length of the road segment;
    a net elevation gain over the road segment;
    a net elevation loss over the road segment; and
    a number of stops along the road segment, and
    wherein the dynamic information associated with the road segment comprises an expected average speed of a vehicle along the road segment,
    wherein the static information associated with the vehicle comprises a vehicle class, and
    wherein the dynamic information associated with the vehicle comprises a vehicle weight.

11. The system of claim 10, wherein the net elevation gain over the route and the net elevation loss over the route are computed from topographical data associated with segments of roads along the route.

12. The system of claim 1, further comprising:
    an accelerometer onboard a data collection vehicle; and
    a collection device onboard the data collection vehicle and configured to collect a plurality of operating data from the data collection vehicle, the plurality of operating data comprising:
      vehicle speed of the data collection vehicle;
      engine speed of the data collection vehicle;
      throttle position of the data collection vehicle;
      geographic positions from a geographic positioning system;
      energy usage of the data collection vehicle; and
      accelerometer data from the accelerometer of the data collection vehicle.

13. The system of claim 12, further comprising a server computer comprising a server processor and a server memory storing instructions that, when executed by the server processor, cause the server processor to:
    receive the plurality of operating data from the collection device of the data collection vehicle;
    aggregate the plurality of operating data with other vehicle operating data for each road segment of the road segments of the road network;
    compute the time consumption model from the aggregated operating data and static information associated with the road segments; and
    compute the energy consumption model from the aggregated operating data and the static information associated with the road segments.

14. The system of claim 13, wherein the time consumption model comprises a linear model,
    wherein the linear model of the time consumption model is configured by performing linear regression to compute a plurality of coefficients of the linear model of the time consumption model based on the aggregated operating data and the static information associated with the road segments,
    wherein the energy consumption model comprises a linear model, and
    wherein the linear model of the energy consumption model is configured by performing linear regression to compute a plurality of coefficients of the linear model of the energy consumption model based on the aggregated operating data and the static information associated with the road segments.

15. The system of claim 13, wherein the time consumption model comprises a neural network,
    wherein the neural network of the time consumption model is configured by performing backpropagation to compute a plurality of weights of connections of the neural network based on the aggregated operating data,
    wherein the energy consumption model comprises a neural network, and
    wherein the neural network of the energy consumption model is configured by performing backpropagation to compute a plurality of weights of connections of the neural network based on the aggregated operating data.

16. A method for generating navigation routes, the method comprising:
    receiving an origin position, in a road network;
    receiving a destination position, in the road network;
    receiving one or more user preferences from a user interface device, where each user preference is a tradeoff value set to one of a plurality of tradeoff values representing different compromises between time efficiency and energy efficiency;
    computing a travel time value for each of a plurality of road segments of the road network using a time consumption model;
    computing an energy consumption for each of the plurality of road segments of the road network using an energy consumption model;
    identifying one or more weighted routes from the origin position to the destination position based on the travel time value and the energy consumption for the road segments and based on the user preference resulting in a compromise between a fastest route and a most energy efficient route in accordance with the one or more user preferences; and display the identified one or more weighted routes.

17. The method of claim 16, further comprising:
computing a most time efficient route based on the time consumption model;
computing a most energy efficient route based on the energy consumption model; and
computing the identified one or more weighted routes based on a weighting of travel time value and energy consumption derived from real-time data from a vehicle and the user input tradeoff value resulting in the compromise between the fastest route and the most energy efficient route.

18. The method of claim 16, wherein a vehicle comprises an onboard geographic positioning system, and
wherein the origin position corresponds to a current position of the vehicle, as provided by the geographic positioning system.

19. The method of claim 16, wherein the user interface device comprises a display device of a navigation system onboard a vehicle, and the identified one or more weighted routes are displayed on the display device.

20. The method of claim 16, further comprising controlling a navigation system of a vehicle remotely
wherein the identified one or more weighted routes are displayed on a computing device remote from the vehicle.

21. The method of claim 16, further comprising supplying the one or more weighted routes to a navigation system of a vehicle configured to control an autonomous driving system of the vehicle to drive the vehicle along the identified one or more weighted routes.

22. The method of claim 16, wherein the computing the travel time value for each of the road segments comprises supplying a plurality of parameters to a time consumption model, the plurality of parameters being based on at least one of:
static information associated with each of the road segments; and
dynamic information associated with each of the road segments.

23. The method of claim 22, wherein the static information associated with each road segment of the road segments comprises:
a length of road segment;
a speed limit along the road segment;
a road class of the road segment; and
a number of stops along the road segment, and
wherein the dynamic information associated with the road segment comprises traffic data.

24. The method of claim 16, wherein the computing the energy consumption for each road segment of the road segments comprises supplying a plurality of parameters to an energy consumption model, the plurality of parameters being based on at least one of:
static information associated with the road segment;
dynamic information associated with the road segment;
static information associated with a vehicle; and
dynamic information associated with the vehicle.

25. The method of claim 24, wherein the static information associated with the road segment comprises:
a length of the road segment;
a net elevation gain over the road segment;
a net elevation loss over the road segment; and
a number of stops along the road segment, and
wherein the dynamic information associated with the road segment comprises an expected average speed of a vehicle along the road segment,
wherein the static information associated with the vehicle comprises a vehicle class, and
wherein the dynamic information associated with the vehicle comprises a vehicle weight.

26. The method of claim 25, wherein the net elevation gain over the route and the net elevation loss over the route are computed from topographical data associated with segments of roads along the route.

27. The method of claim 16, wherein a data collection vehicle comprises:
an accelerometer onboard the data collection vehicle;
a collection device onboard the data collection vehicle and configured to collect a plurality of operating data from the data collection vehicle, the plurality of operating data comprising:
vehicle speed of the data collection vehicle;
engine speed of the data collection vehicle;
throttle position of the data collection vehicle;
geographic positions from a geographic positioning system;
energy usage of the data collection vehicle; and
accelerometer data from the accelerometer of the data collection vehicle.

28. The method of claim 27, further comprising:
receiving the plurality of operating data from the collection device of the data collection vehicle;
aggregating the plurality of operating data with other vehicle operating data for each road segment of the road segments of the road network;
computing the time consumption model from the aggregated operating data and static information associated with the road segments; and
computing the energy consumption model from the aggregated operating data and the static information associated with the road segments.

29. The method of claim 28, wherein the time consumption model comprises a linear model,
wherein the linear model of the time consumption model is configured by performing linear regression to compute a plurality of coefficients of the linear model of the time consumption model based on the aggregated operating data and the static information associated with the road segments,
wherein the energy consumption model comprises a linear model, and
wherein the linear model of the energy consumption model is configured by performing linear regression to compute a plurality of coefficients of the linear model of the energy consumption model based on the aggregated operating data and the static information associated with the road segments.

30. The method of claim 28, wherein the time consumption model comprises a neural network,
wherein the neural network of the time consumption model is configured by performing backpropagation to compute a plurality of weights of connections of the neural network based on the aggregated operating data,
wherein the energy consumption model comprises a neural network, and
wherein the neural network of the energy consumption model is configured by performing backpropagation to compute a plurality of weights of connections of the neural network based on the aggregated operating data.

31. A system for generating navigation routes for a vehicle, the system comprising:

a processor;
a memory coupled to the processor, the memory storing instructions that, when executed by the processor, cause the processor to:
 receive an origin position, in a road network, of the vehicle;
 receive a destination position, in the road network;
 receive one or more user preferences from a user interface device, where each user preference is a tradeoff value set to one of a plurality of tradeoff values representing different compromises between time efficiency and energy efficiency;
 compute a travel time value for each of a plurality of road segments of the road network using a time consumption model;
 compute an energy consumption for each of the plurality of road segments of the road network using an energy consumption model;
 identify one or more weighted routes from the origin position to the destination position based on the travel time value and the energy consumption for the road segments and based on the user preference resulting in a compromise between a fastest route and a most energy efficient route in accordance with the one or more user preferences; and
 display the identified one or more weighted routes,
wherein aggregated operating data is collected from a plurality of data collection vehicles, each data collection vehicle of the data collection vehicles comprising:
 an accelerometer onboard a data collection vehicle; and
 a collection device onboard the data collection vehicle and configured to collect a plurality of operating data from the data collection vehicle, the plurality of operating data comprising:
  vehicle speed of the data collection vehicle;
  engine speed of the data collection vehicle;
  throttle position of the data collection vehicle;
  geographic positions from a geographic positioning system;
  energy usage of the data collection vehicle; and
  accelerometer data from the accelerometer of the data collection vehicle,
wherein the time consumption model is computed from the aggregated operating data and static information associated with the road segments, and
wherein the energy consumption model is computed from the aggregated operating data and the static information associated with the road segments.

32. The system of claim 1, wherein the memory stores instructions that, when executed by the processor, cause the processor to receive the one or more user preferences from the user interface device while en route from the origin position to the destination position.

33. The method of claim 16, wherein the one or more user preferences are received from the user interface device while en route from the origin position to the destination position.

* * * * *